(12) United States Patent
Ishikawa et al.

(10) Patent No.: US 12,321,076 B2
(45) Date of Patent: Jun. 3, 2025

(54) METHOD FOR MANUFACTURING OPTICAL MODULATOR, TESTING METHOD, NON-TRANSITORY STORAGE MEDIUM, AND LIGHT TRANSMISSION APPARATUS

(71) Applicant: Sumitomo Electric Industries, Ltd., Osaka (JP)

(72) Inventors: Tsutomu Ishikawa, Osaka (JP); Naoya Kono, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 556 days.

(21) Appl. No.: 17/572,742

(22) Filed: Jan. 11, 2022

(65) Prior Publication Data
US 2022/0236620 A1 Jul. 28, 2022

(30) Foreign Application Priority Data

Jan. 28, 2021 (JP) .................................. 2021-012460

(51) Int. Cl.
*G02F 1/225* (2006.01)
*G02F 1/025* (2006.01)

(52) U.S. Cl.
CPC ............ *G02F 1/2257* (2013.01); *G02F 1/025* (2013.01); *G02F 2203/20* (2013.01); *G02F 2203/69* (2013.01)

(58) Field of Classification Search
CPC .... G02F 1/2257; G02F 1/025; G02F 2203/20; G02F 2203/69
USPC ........................................................ 385/1–3
See application file for complete search history.

(56) References Cited

U.S. PATENT DOCUMENTS

| 7,715,732 B2* | 5/2010 | Koh ...................... G02F 1/0123 398/198 |
| 10,180,617 B1 | 1/2019 | Takei |
| 2009/0003841 A1* | 1/2009 | Ghidini ................. G02F 1/2257 398/186 |
| 2011/0235971 A1* | 9/2011 | Hashimoto ............ B82Y 20/00 385/31 |
| 2014/0099053 A1* | 4/2014 | Sato ...................... G02F 1/0123 385/3 |
| 2014/0241659 A1 | 8/2014 | Fukuda et al. |
| 2016/0156418 A1 | 6/2016 | Yamanaka et al. |

FOREIGN PATENT DOCUMENTS

| JP | 2014-164243 A | 9/2014 |
| JP | 2016-111398 A | 6/2016 |
| JP | 2018-087846 A | 6/2018 |

* cited by examiner

Primary Examiner — Robert Tavlykaev
(74) Attorney, Agent, or Firm — Volpe Koenig

(57) ABSTRACT

A method for manufacturing an optical modulator is disclosed. The optical modulator includes a Mach-Zehnder modulator, the Mach-Zehnder modulator including an electrode and an arm waveguide, the electrode being provided on the arm waveguide. The method includes a step of preparing the Mach-Zehnder modulator, a step of acquiring a relationship between a voltage applied to the electrode and a phase change amount of light propagating through the arm waveguide based on a light transmittance in the arm waveguide, a step of acquiring a voltage in which a range of a phase change amount of light in the Mach-Zehnder modulator has a predetermined range based on the relationship, and a step of storing the voltage in a storage unit.

10 Claims, 26 Drawing Sheets

METHOD FOR MANUFACTURING OPTICAL MODULATOR, TESTING METHOD, NON-TRANSITORY STORAGE MEDIUM, AND LIGHT TRANSMISSION APPARATUS

CROSS REFERENCE TO RELATED APPLICATIONS

This application claims priority based on Japanese Patent Application No. 2021-012460, filed on Jan. 28, 2021, and the entire contents of the Japanese patent application are incorporated herein by reference.

TECHNICAL FIELD

The present disclosure relates to a method for manufacturing an optical modulator, a testing method, a non-transitory storage medium, and a light transmission apparatus.

BACKGROUND ART

A Mach-Zehnder modulator formed of a semiconductor layer and modulating light has been developed (Patent Documents 1 and 2).
[Patent Document 1] Japanese Unexamined Patent Application Publication No. 2014-164243
[Patent Document 2] Japanese Unexamined Patent Application Publication No. 2016-111398

SUMMARY OF THE INVENTION

A method according to the present disclosure is a method for manufacturing optical modulator, the optical modulator including a Mach-Zehnder modulator. The Mach-Zehnder modulator includes an electrode and an arm waveguide, the electrode being disposed on the arm waveguide. The method includes a step of preparing the Mach-Zehnder modulator, a step of acquiring, based on a light transmittance in the arm waveguide, a relationship between a voltage applied to the electrode and a phase change amount of light propagating through the arm waveguide, a step of acquiring, based on the relationship, a voltage in which a range of a phase change amount of light in the Mach-Zehnder modulator has a predetermined range, and a step of storing the voltage acquired in the step of acquiring the voltage in a storage unit.

A testing method according to the present disclosure is a method for testing an optical modulator. The optical modulator includes a Mach-Zehnder modulator, the Mach-Zehnder modulator including an electrode and arm waveguide, the electrode being disposed on the arm waveguide. The method includes a step of acquiring, based on a light transmittance in the arm waveguide, a relationship between a voltage applied to the electrode and a phase change amount of light propagating through the arm waveguide, and a step of acquiring, based on the relationship, a voltage in which a range of a phase change amount of light in the Mach-Zehnder modulator has a predetermined range.

A non-transitory storage medium according to the present disclosure is a non-transitory storage medium storing a program for testing an optical modulator. The optical modulator includes a Mach-Zehnder modulator. The Mach-Zehnder modulator includes an electrode and an arm waveguide, the electrode being disposed on the arm waveguide. The program causes a computer to execute a process of acquiring, based on a light transmittance in the arm waveguide, a relationship between a voltage applied to the electrode and a phase change amount of light propagating through the arm waveguide, and a process of acquiring, based on the relationship, a voltage in which a range of a phase change amount of light in the Mach-Zehnder modulator has a predetermined range.

A light transmission apparatus according to the present disclosure includes a plurality of Mach-Zehnder modulators, and a storage unit. The plurality of Mach-Zehnder modulators each include an electrode and an arm waveguide. The electrode is disposed on the arm waveguide. The storage unit stores, for each of the plurality of Mach-Zehnder modulators, a voltage in which a range of a phase change amount of light in the Mach-Zehnder modulator has a predetermined range.

DESCRIPTION OF EMBODIMENTS

Figure 1A:
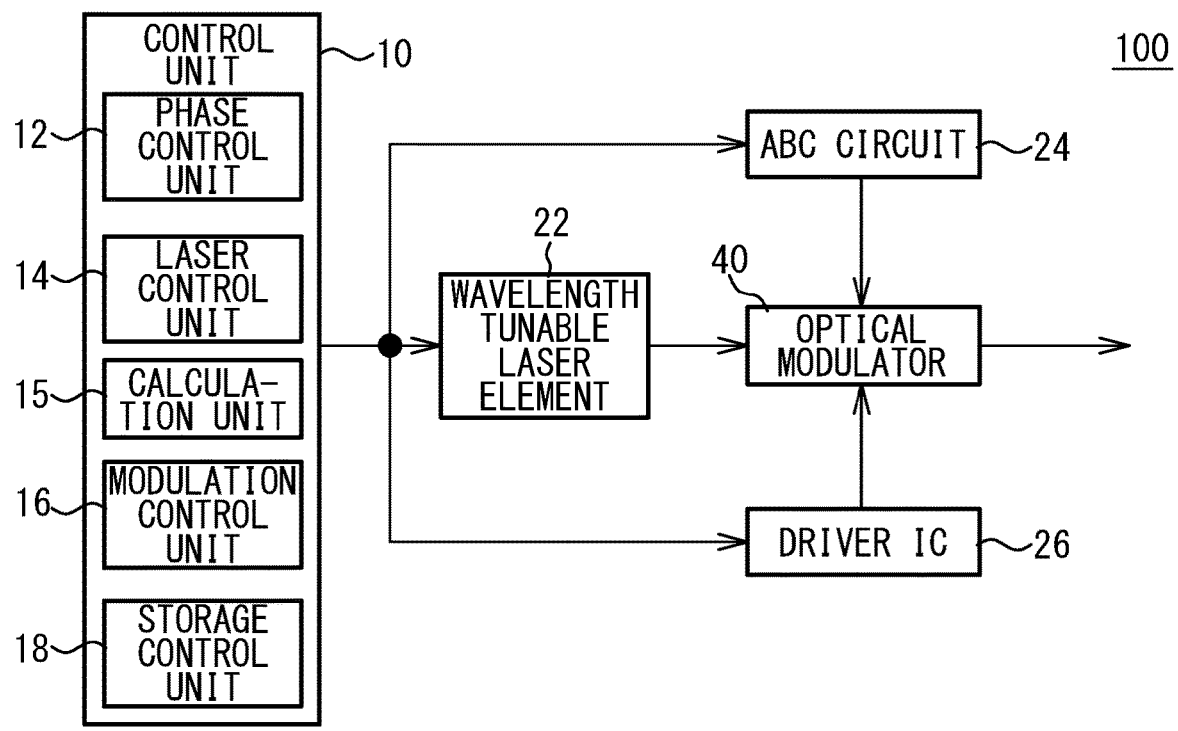
FIG. 1A is a block diagram illustrating a light transmission apparatus according to a first embodiment.

Light propagates through an arm waveguide of the Mach-Zehnder modulator. A phase of light can be adjusted by applying a voltage to the Mach-Zehnder modulator. In order to adjust the phase to a desired magnitude, it is important to set a range of a phase change amount (phase adjusting range) by application of the voltage to a predetermined magnitude.

The magnitude of the phase change amount with respect to the voltage (phase adjusting efficiency) varies from Mach-Zehnder modulator to Mach-Zehnder modulator. When the same voltage is applied to a plurality of Mach-Zehnder modulators, the phase change amount in one Mach-Zehnder modulator is large and the phase change amount in another Mach-Zehnder modulator is small. Even in the Mach-Zehnder modulator having a small phase adjusting efficiency, the voltage may be increased in order to set the phase adjusting range to a predetermined magnitude. However, there is a positive correlation between the phase adjusting efficiency and the absorption loss of light. Increasing the voltage also increases the absorption loss of light. Therefore, it is an object of the present disclosure to provide a method for manufacturing optical modulator, a testing method, a non-transitory storage medium, and light transmission apparatus capable of suppressing an increase in light absorption loss.

First, contents of embodiments of the present disclosure will be listed and described.

An aspect of the present disclosure is (1) a method for manufacturing an optical modulator, the optical modulator including a Mach-Zehnder modulator. The Mach-Zehnder modulator includes an electrode and an arm waveguide, the electrode being disposed on the arm waveguide. The method includes a step of preparing the Mach-Zehnder modulator, a step of acquiring, based on a light transmittance in the arm waveguide, a relationship between a voltage applied to the electrode and a phase change amount of light propagating through the arm waveguide, a step of acquiring, based on the relationship, a voltage in which a range of a phase change amount of light in the Mach-Zehnder modulator has a predetermined range, and a step of storing the voltage acquired in the step of acquiring the voltage in a storage unit. By applying the acquired voltage to the Mach-Zehnder modulator, the range of the phase change amount can be set to a predetermined magnitude, and an increase in light absorption loss can be suppressed.

(2) The step of preparing the Mach-Zehnder modulator may be a step of preparing a plurality of the Mach-Zehnder modulators, and the step of acquiring the relationship between the voltage and the phase change amount and the step of acquiring the voltage may be performed on each of the plurality of Mach-Zehnder modulators. The voltage is optimized for each of the plurality of Mach-Zehnder modulators. By applying the optimized voltage to the Mach-Zehnder modulator, the range of the phase change amount can be set to a predetermined magnitude, and an increase in the absorption loss of light can be suppressed.

(3) The step of preparing the Mach-Zehnder modulator may include a step of preparing a main Mach-Zehnder modulator and a step of preparing a sub Mach-Zehnder modulator, and the step of acquiring the relationship between the voltage and the phase change amount and the step of acquiring the voltage may be performed on each of the main Mach-Zehnder modulator and the sub Mach-Zehnder modulator. The range of the phase change amount of the main Mach-Zehnder modulator and the sub Mach-Zehnder are set to a predetermined magnitude and an increase of the absorption loss of light can be suppressed.

(4) The step of preparing the Mach-Zehnder modulator may include a step of preparing the Mach-Zehnder modulator including a first arm waveguide, and a second arm waveguide, a first electrode, and a second electrode. The first electrode is disposed on the first arm waveguide, and the second electrode is disposed on the second arm waveguide. The step of acquiring the relationship between the voltage and the phase change amount may include a step of acquiring a relationship between a voltage applied to the first electrode and a phase change amount of light propagating through the first arm waveguide, and a step of acquiring a relationship between a voltage applied to the second electrode and a phase change amount of light propagating through the second arm waveguide. The range of the phase change amount of the light in the Mach-Zehnder modulator may be a range of a difference between the phase change amount of the light propagating through the first arm waveguide and the phase change amount of the light propagating through the second arm waveguide. The step of acquiring the voltage may be a step of acquiring a voltage applied to the first electrode and a voltage applied to the second electrode, in which the range of the phase change amount of the light in the Mach-Zehnder modulator the predetermined range. The range of the phase change amount is set to a predetermined magnitude, and the increase of the absorption loss of light can be suppressed.

(5) The voltage applied to the first electrode may be a sum of a first voltage and a second voltage, the voltage applied to the second electrode may be a difference between the first voltage and the second voltage, and the step of acquiring the voltage may be a step of acquiring the first voltage in which the range of the phase change amount of the light in the Mach-Zehnder modulator has the predetermined range. The Mach-Zehnder modulator is differentially driven by using the first voltage as a central voltage and the second voltage as a differential voltage. The range of the phase change amount is set to a predetermined magnitude, and the increase of the absorption loss of light can be suppressed.

(6) The method may further include a step of measuring a first transmittance which is a light transmittance in the arm waveguide, and a step of calculating a second transmittance which is a light transmittance in the arm waveguide. In the step of calculating the second transmittance, the second transmittance is represented by a function of the phase change amount of the light propagating through the arm waveguide, the phase change amount of the light propagating through the arm waveguide is represented by a function of the voltage applied to the electrode, and thus the second transmittance is calculated. In the step of acquiring the relationship between the voltage and the phase change amount, the second transmittance is adjusted such that the second transmittance approaches the first transmittance, and thus the relationship between the voltage and the phase change amount is acquired. By bringing the second transmittance closer to the first transmittance, a highly accurate relationship between the voltage and the phase change amount can be obtained. The range of the phase change amount is set to a predetermined magnitude, and the increase of the absorption loss of light can be suppressed.

(7) The step of preparing the Mach-Zehnder modulator may include a step of forming the Mach-Zehnder modulator, and the step of forming the Mach-Zehnder modulator may include a step of forming the arm waveguide including a first semiconductor layer, a core layer, and a second semiconductor layer. The first semiconductor layer, the core layer, and the second semiconductor layer are stacked in order. The first semiconductor layer may have a first conductivity type, and the second semiconductor layer may have a second conductivity type. Dopants are added to the first semiconductor layer and the second semiconductor layer. The phase adjusting efficiency of the Mach-Zehnder modulator varies due to the variation in the amount of thermal diffusion of the dopants. By applying the acquired voltage to the Mach-Zehnder modulator, the range of the phase change amount can be set to a predetermined magnitude, and an increase in light absorption loss can be suppressed.

(8) Another aspect of the present disclosure is a method for testing an optical modulator. The optical modulator includes a Mach-Zehnder modulator, the Mach-Zehnder modulator including an electrode and arm waveguide, the electrode being disposed on the arm waveguide. The method includes a step of acquiring, based on a light transmittance in the arm waveguide, a relationship between a voltage applied to the electrode and a phase change amount of light propagating through the arm waveguide, and a step of acquiring, based on the relationship, a voltage in which a range of a phase change amount of light in the Mach-Zehnder modulator has a predetermined range. By applying the acquired voltage to the Mach-Zehnder modulator, the range of the phase change amount can be set to a predetermined magnitude, and an increase in light absorption loss can be suppressed.

(9) Another aspect of the present disclosure is a non-transitory storage medium storing a program for testing an optical modulator. The optical modulator includes a Mach-Zehnder modulator. The Mach-Zehnder modulator includes an electrode and an arm waveguide, the electrode being disposed on the arm waveguide. The program causes a computer to execute a process of acquiring, based on a light transmittance in the arm waveguide, a relationship between a voltage applied to the electrode and a phase change amount of light propagating through the arm waveguide, and a process of acquiring, based on the relationship, a voltage in which a range of a phase change amount of light in the Mach-Zehnder modulator has a predetermined range. By applying the acquired voltage to the Mach-Zehnder modulator, the range of the phase change amount can be set to a predetermined magnitude, and an increase in light absorption loss can be suppressed.

(10) Another aspect of the present disclosure is a light transmission apparatus. The apparatus includes a plurality of Mach-Zehnder modulators, and a storage unit. The plurality of Mach-Zehnder modulators each include an electrode and an arm waveguide. The electrode is disposed on the arm waveguide. The storage unit stores, for each of the plurality of Mach-Zehnder modulators, a voltage in which a range of a phase change amount of light in the Mach-Zehnder modulator has a predetermined range. By applying the stored voltage to the Mach-Zehnder modulator, the range of the phase change amount can be set to a predetermined magnitude, and an increase in light absorption loss can be suppressed.

DETAILED DESCRIPTION OF EMBODIMENTS OF THE DISCLOSURE

Specific examples of a method for manufacturing an optical modulator, a testing method, a non-transitory storage medium storing a testing program, and a light transmission apparatus according to embodiments of the present disclosure will be described below with reference to the drawings. Note that the present disclosure is not limited to these examples, but is defined by the scope of the claims, and is intended to include all modifications within the meaning and scope equivalent to the scope of the claims.

First Embodiment (Light Transmission Apparatus)

FIG. 1A is a block diagram illustrating a light transmission apparatus 100 according to a first embodiment. As illustrated in FIG. 1A, light transmission apparatus 100 includes a control unit 10, a wavelength tunable laser element 22, an automatic bias control (ABC) circuit 24, a driver integrated circuit (IC) 26, and an optical modulator 40.

Wavelength tunable laser element 22 is a light emitting element including, for example, a semiconductor laser element. ABC circuit 24 applies a voltage for phase adjustment to optical modulator 40 to perform an automatic bias control. Driver IC 26 inputs a modulation signal to optical modulator 40. Optical modulator 40 modulates light incident from wavelength tunable laser element 22 and emits modulated light. Control unit 10 includes a computer such as a personal computer (PC).

Figure 1B:
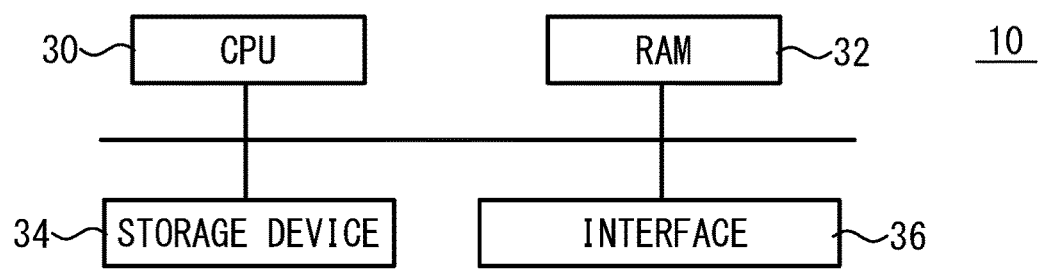
FIG. 1B is a block diagram illustrating a hardware configuration of a control unit.

FIG. 1B is a block diagram illustrating a hardware configuration of control unit 10. As illustrated in FIG. 1B, control unit 10 includes a CPU (Central Processing Unit) 30, a RAM (Random Access Memory) 32, a storage device 34 (storage unit), and an interface 36. CPU 30, RAM 32, storage device 34, and interface 36 are connected to each other via a bus or the like. RAM 32 is a volatile memory that temporarily stores programs, data, and the like. Storage device 34 is, for example, a read only memory (ROM), a solid state drive (SSD) such as a flash memory, or a hard disk drive (HHD). Storage device 34 stores a program for executing processing described later, a voltage obtained in the processing, and the like.

When CPU 30 executes the program stored in RAM 32, a phase control unit 12, a laser control unit 14, a calculation unit 15, a modulation control unit 16, and a storage control unit 18 illustrated in FIG. 1A are implemented in control unit 10. Phase control unit 12 controls ABC circuit 24 to adjust the voltage applied to optical modulator 40 by ABC circuit 24. Laser control unit 14 controls wavelength tunable laser element 22. Calculation unit 15 calculates a transmittance, a phase change amount, a phase adjusting range, and the like as described later. Modulation control unit 16 controls driver IC 26. Storage control unit 18 controls RAM 32 and storage device 34 illustrated in FIG. 1B to store data therein. Each unit of control unit 10 may be hardware such as a circuit.

(Modulator)

Figure 2A:
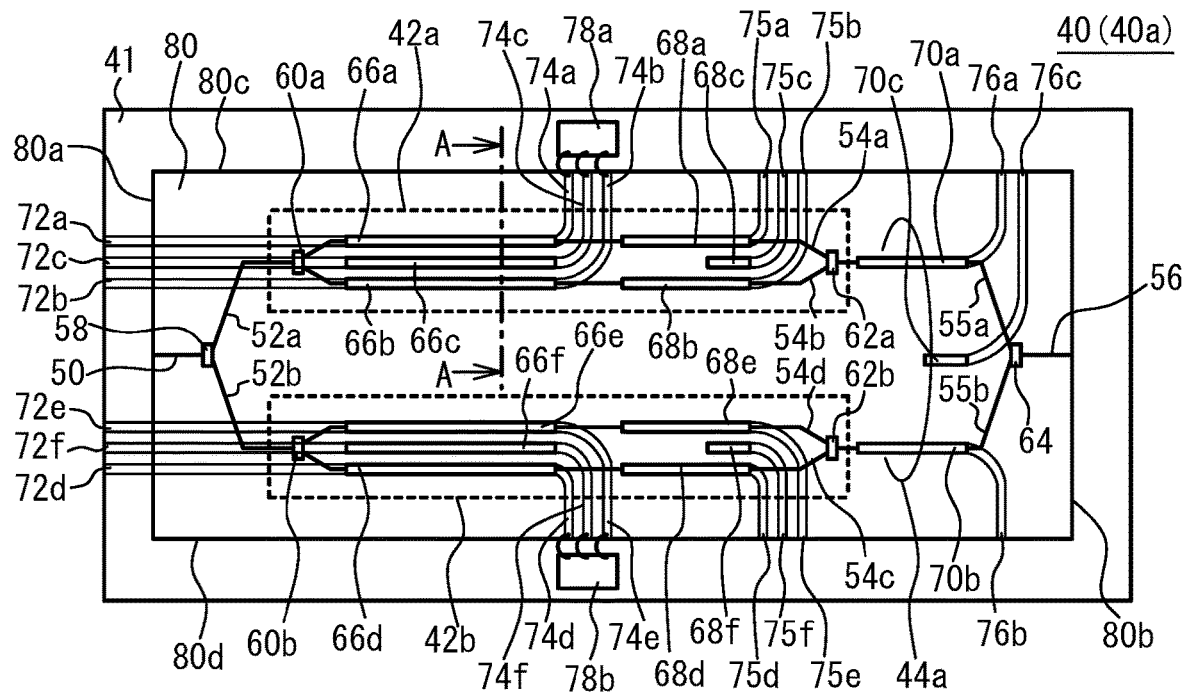
FIG. 2A is a plan view illustrating an optical modulator.

FIG. 2A is a plan view illustrating an optical modulator 40a. In the first embodiment, optical modulator 40a is used as optical modulator 40 illustrated in FIG. 1A. Optical modulator 40a is an In-phase Quadrature (IQ) modulator, and includes a substrate 41, two sub Mach-Zehnder modulators 42a and 42b, and a main Mach-Zehnder modulator 44a. Substrate 41 is an insulating substrate made of, for example, ceramic. A module including optical modulator 40a may be formed by providing substrate 41 with ABC circuit 24 and driver IC 26 of FIG. 1A, and lenses and the like (not illustrated).

A semiconductor substrate 80 and two termination elements 78a and 78b are mounted on an upper surface of substrate 41. Termination elements 78a and 78b include, for example, a termination resistor and a capacitor. Two sub Mach-Zehnder modulators 42a and 42b, main Mach-Zehnder modulator 44a, an input waveguide 50, and an output waveguide 56 are formed on semiconductor substrate 80. Semiconductor substrate 80 has four end surfaces 80a, 80b, 80c and 80d. End surface 80a and end surface 80b face each other. End surface 80c and end surface 80d face each other.

A first end portion of input waveguide 50 is located on end surface 80a of the four end surfaces of semiconductor substrate 80. A second end portion of input waveguide 50 is connected to a coupler 58. A first end portion of output waveguide 56 is connected to a coupler 64. A second end portion of output waveguide 56 is located on end surface 80b of the four end surfaces of semiconductor substrate 80. Coupler 58 is a one input two output (1×2) multimode interference (MMI) coupler. Coupler 64 is a two input one output (2×1) MMI coupler. Two sub Mach-Zehnder modulators 42a and 42b are arranged in parallel between coupler 58 and coupler 64. Main Mach-Zehnder modulator 44a is arranged between two sub Mach-Zehnder modulators 42a and 42b and coupler 64.

(Sub Mach-Zehnder Modulator)

Sub Mach-Zehnder modulator 42a is, for example, a modulator for an In-phase channel (Ich). Sub Mach-Zehnder modulator 42b is, for example, a modulator for a Quadrature channel (Qch). Sub Mach-Zehnder modulator 42a includes arm waveguides 52a, 54a and 54b, modulation electrodes 66a and 66b, phase adjusting electrodes 68a and 68b, and ground electrodes 66c and 68c. Arm waveguide 54a is, for example, a p-side waveguide. Arm waveguide 54b is, for example, an n-side waveguide.

A first end portion of arm waveguide 52a is connected to a first output end of two output ends of coupler 58. A second end portion of arm waveguide 52a is connected to an input end of a coupler 60a. A first end portion of arm waveguide 54a (first arm waveguide) is connected to a first output end of two output ends of coupler 60a. A second end portion of arm waveguide 54a is connected to a first input end of two input ends of a coupler 62a. A first end portion of arm waveguide 54b (second arm waveguide) is connected to a second output end of the two output ends of coupler 60a. A second end portion of arm waveguide 54b is connected to a second input end of the two input ends of coupler 62a.

Arm waveguide 52a bends in the vicinity of coupler 58. Arm waveguides 54a and 54b bend in the vicinity of coupler 60a and bend in the vicinity of coupler 62a. Except for these bent portions, arm waveguides 52a, 54a and 54b are parallel to each other and parallel to end surface 80c of semiconductor substrate 80.

Modulation electrode 66a and phase adjusting electrode 68a are disposed on arm waveguide 54a. Modulation electrode 66a and phase adjusting electrode 68a (first electrode) are separated from each other and arranged in order from coupler 60a toward coupler 62a. Modulation electrode 66b and phase adjusting electrode 68b are disposed on arm waveguide 54b. Modulation electrode 66b and phase adjusting electrode 68b (second electrode) are separated from each other and arranged in order from coupler 60a toward coupler 62a.

Modulation electrode 66a and modulation electrode 66b face each other in a direction intersecting the extending direction of arm waveguides 54a and 54b. Ground electrode 66c is located between modulation electrode 66a and modulation electrode 66b. Phase adjusting electrode 68a and phase adjusting electrode 68b face each other. Ground electrode 68c is located between phase adjusting electrode 68a and phase adjusting electrode 68b. Modulation electrodes 66a and 66b, phase adjusting electrodes 68a and 68b, and ground electrodes 66c and 68c extend in the same direction as arm waveguides 54a and 54b, and are parallel to end surface 80c of semiconductor substrate 80.

Wiring lines 72a and 74a are electrically connected to modulation electrode 66a. Wiring line 72a extends from a first end portion of modulation electrode 66a to end surface 80a of semiconductor substrate 80. Wiring line 74a extends from a second end portion of modulation electrode 66a to end surface 80c of semiconductor substrate 80. Wiring lines 72b and 74b are electrically connected to modulation electrode 66b. Wiring line 72b extends from a first end portion of modulation electrode 66b to end surface 80a. Wiring line 74b extends from a second end portion of modulation electrode 66b to end surface 80c. Wiring lines 72c and 74c are electrically connected to ground electrode 66c. Wiring line 72c extends from a first end portion of ground electrode 66c to end surface 80a. Wiring line 74c extends from a second end portion of ground electrode 66c to end surface 80c.

Modulation electrode 66a is electrically connected to driver IC 26 illustrated in FIG. 1A via wiring line 72a. Modulation electrode 66b is electrically connected to driver IC 26 via wiring line 72b. Ground electrode 66c is electrically connected to driver IC 26 via wiring line 72c. Wiring lines 74a, 74b and 74c are electrically connected to termination element 78a by bonding wires.

A wiring line 75a is electrically connected to phase adjusting electrode 68a. A wiring line 75b is electrically connected to phase adjusting electrode 68b. A wiring line 75c is electrically connected to ground electrode 68c. Wiring lines 75a, 75b and 75c extend to end surface 80c. Phase adjusting electrode 68a is electrically connected to ABC circuit 24 via wiring line 75a. Phase adjusting electrode 68b is electrically connected to ABC circuit 24 via wiring line 75b. Ground electrode 68c is electrically connected to ABC circuit 24 via wiring line 75c.

Sub Mach-Zehnder modulator 42b includes arm waveguides 52b, 54c and 54d, modulation electrodes 66d and a 66e, phase adjusting electrodes 68d and a 68e, and ground electrodes 66f and 68f. Arm waveguide 54c (first arm waveguide) is, for example, a p-side waveguide. Arm waveguide 54d (second arm waveguide) is, for example, an n-side waveguide.

A first end portion of arm waveguide 52b is connected to the second output end of coupler 58. A second end portion of arm waveguide 52b is connected to the input end of a coupler 60b. Arm waveguides 54c and 54d are connected to coupler 60b and a coupler 62b. The lengths of arm waveguides of sub Mach-Zehnder modulator 42b are equal to the lengths of the corresponding arm waveguides of sub Mach-Zehnder modulator 42a. The shapes of arm waveguides of sub Mach-Zehnder modulator 42b are the same as the shapes of the corresponding arm waveguides of sub Mach-Zehnder modulator 42a.

A modulation electrode 66d and phase adjusting electrode 68d (first electrode) are provided on arm waveguide 54c. A modulation electrode 66e and phase adjusting electrode 68e (second electrode) are provided on arm waveguide 54d. Ground electrode 66f is provided between modulation electrode 66d and modulation electrode 66e. Ground electrode 68f is provided between phase adjusting electrode 68d and phase adjusting electrode 68e.

Wiring lines 72d and 74d are electrically connected to modulation electrode 66d. Wiring lines 72e and 74e are electrically connected to modulation electrode 66e. Wiring lines 72f and 74f are electrically connected to ground electrode 66f. Wiring lines 72d, 72e and 72f extend to end surface 80a of semiconductor substrate 80. Modulation electrode 66d is electrically connected to driver IC 26 via wiring line 72d. Modulation electrode 66e is electrically connected to driver IC 26 via wiring line 72e. Ground electrode 66f is electrically connected to driver IC 26 via wiring line 72f. Wiring lines 74d, 74e and 74f extend to end surface 80d of semiconductor substrate 80 and are electrically connected to termination element 78b.

A wiring line 75d is electrically connected to phase adjusting electrode 68d. A wiring line 75e is electrically connected to phase adjusting electrode 68e. A wiring line 75f is electrically connected to ground electrode 68f. Wiring lines 75d, 75e and 75f extend to end surface 80d. Phase adjusting electrode 68d is electrically connected to ABC circuit 24 via wiring line 75d. Phase adjusting electrode 68e is electrically connected to ABC circuit 24 via wiring line 75e. Ground electrode 68f is electrically connected to ABC circuit 24 via wiring line 75f.

The lengths of modulation electrodes 66a, 66b, 66d and 66e and the lengths of ground electrodes 66c and 66f are equal to each other. The lengths of phase adjusting electrodes 68a, 68b, 68d and 68e are equal to each other and smaller than the lengths of modulation electrodes. The lengths of ground electrodes 68c and 68f are equal to each other and smaller than the lengths of phase adjusting electrodes.

(Main Mach-Zehnder Modulator)

Main Mach-Zehnder modulator 44a has arm waveguides 55a and 55b, phase adjusting electrodes 70a and 70b, and a ground electrode 70c. A first end portion of arm waveguide 55a (first arm waveguide) is connected to an output end of coupler 62a. A first end portion of arm waveguide 55b (second arm waveguide) is connected to an output end of coupler 62b. A second end portion of each of arm waveguides 55a and 55b is connected to an input end of coupler 64. Portions of arm waveguides 55a and 55b near sub Mach-Zehnder modulator are parallel to end surface 80c of semiconductor substrate 80, and portions of arm waveguides 55a and 55b near coupler 64 are bent.

A phase adjusting electrode 70a (first electrode) is provided on arm waveguide 55a. A phase adjusting electrode 70b (second electrode) is provided on arm waveguide 55b. Ground electrode 70c is provided between arm waveguide 55a and arm waveguide 55b. Phase adjusting electrodes 70a and 70b and ground electrode 70c extend in the same direction as the arm waveguides and are parallel to end surface 80c.

A wiring line 76a is electrically connected to an end portion of phase adjusting electrode 70a and extends to end surface 80c. A wiring line 76b is electrically connected to an end portion of phase adjusting electrode 70b and extends to end surface 80d. A wiring line 76c is electrically connected to an end portion of ground electrode 70c and extends to end surface 80c. Phase adjusting electrode 70a is electrically connected to ABC circuit 24 via wiring line 76a. Phase adjusting electrode 70b is electrically connected to ABC circuit 24 via wiring line 76b. Ground electrode 70c is electrically connected to ABC circuit 24 via wiring line 76c.

Figure 2B:
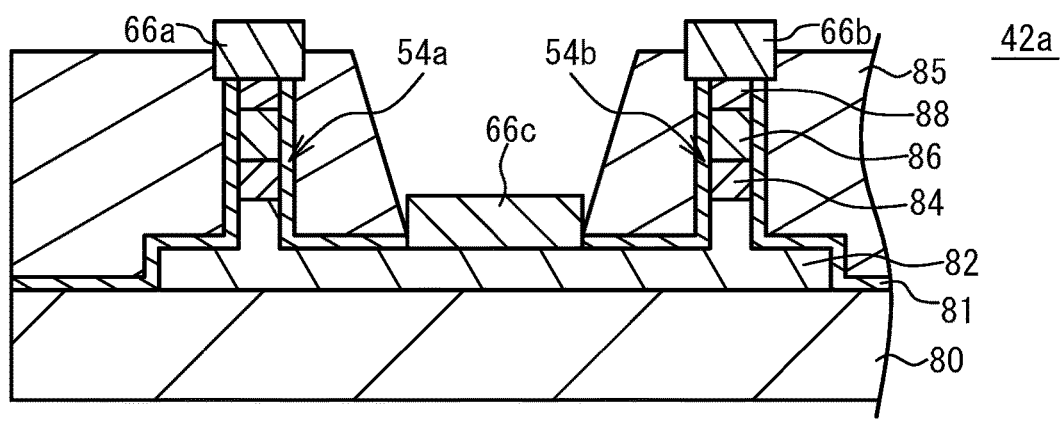
FIG. 2B is a cross-sectional view taken along line A-A of FIG. 2A.

FIG. 2B is a cross-sectional view taken along line A-A of FIG. 2A illustrating a cross section of sub Mach-Zehnder modulator 42a. Sub Mach-Zehnder modulator 42b and main Mach-Zehnder modulator 44a also have the same configuration as sub Mach-Zehnder modulator 42a.

As illustrated in FIG. 2B, a cladding layer 82 (first semiconductor layer) is provided on an upper surface of semiconductor substrate 80. Cladding layer 82 protrudes to the opposite side (upper side in the drawing) of semiconductor substrate 80 at two positions. Core layer 84, a cladding layer 86, and a contact layer 88 are sequentially stacked on the protruding portion. Cladding layer 82, core layer 84, cladding layer 86, and contact layer 88 form mesa-shaped arm waveguides 54a and 54b. Cladding layer 86 and contact layer 88 correspond to the second semiconductor layer.

Semiconductor substrate 80 is formed of, for example, semi-insulating indium phosphide (InP). Cladding layer 82 is formed of, for example, n-type InP (n-InP) having a thickness of 800 nm. Cladding layer 86 is formed of, for example, p-InP having a 1300 nm. Contact layer 88 is formed of, for example, p-InGaAs having a thickness of 200 nm. The n-type cladding layer 82 is doped with, for example, silicon (Si). The p-type cladding layer 86 and contact layer 88 are doped with, for example, zinc (Zn).

Core layer 84 has, for example, a multiple quantum well (MQW) structure. Core layer 84 includes a plurality of well layers and barrier layers alternately stacked. The well layer is formed of, for example, aluminum gallium indium arsenide (AlGaInAs). The barrier layer is formed of, for example, aluminum indium arsenide (AlInAs). Core layer 84 is, for example, a thickness of 500 nm.

The upper surface of semiconductor substrate 80, surfaces of cladding layer 82, and side surfaces and upper surfaces of arm waveguides 54a and 54b are covered with an insulating film 81. Insulating film 81 is formed of an insulator such as silicon oxide ($SiO_2$). A resin layer 85 is formed of, for example, benzocyclobutene (BCB) and covers a surface of insulating film 81. Insulating film 81 and resin layer 85 have openings in a portion of an upper surface of cladding layer 82 between arm waveguides 54a and 54b, and on arm waveguides 54a and 54b.

Modulation electrode 66a is provided on arm waveguide 54a. Modulation electrode 66b is provided on arm waveguide 54b. Modulation electrodes 66a and 66b are electrically connected to contact layer 88 exposed from the openings of insulating film 81 and resin layer 85. Ground electrode 66c is disposed on cladding layer 82 and electrically connected to cladding layer 82 exposed from insulating film 81 and resin layer 85. Phase adjusting electrodes 68a and 68b illustrated in FIG. 2A are also provided on an upper surface of contact layer 88. A ground electrode 68c is also provided on the upper surface of cladding layer 82.

Modulation electrode and phase adjusting electrode each have an ohmic electrode layer and wiring line layer. The ohmic electrode layer includes, for example, a platinum (Pt) layer, a titanium (Ti) layer, a platinum (Pt) layer, and a gold (Au) layer. These layers are laminated in order on contact layer 88. Wiring line layer is formed of, for example, Au or the like in contact with an upper surface of the ohmic electrode layer. Ground electrode has, for example, an alloy layer and an Au layer. The alloy layer is formed of, for example, an alloy of Au, germanium (Ge), and nickel (Ni). The Au layer is in contact with an upper surface of the alloy layer. Wiring line illustrated in FIG. 2A is provided on resin layer 85 illustrated in FIG. 2B and is made of a metal such as Au.

(Operation of Light Transmission Apparatus)

Next, the operation of light transmission apparatus 100 will be described. Laser control unit 14 of control unit 10 illustrated in FIG. 1A causes wavelength tunable laser element 22 to emit light. Light incident on input waveguide 50 of optical modulator 40a illustrated in FIG. 2A is branched at coupler 58 and propagates through arm waveguides 52a and 52b. The light propagating in arm waveguide 52a is branched in coupler 60a and propagates through arm waveguides 54a and 54b. The light propagating in arm waveguide 52b is branched in coupler 60b and propagates through arm waveguides 54c and 54d.

Modulation control unit 16 of control unit 10 illustrated in FIG. 1A generates a modulation signal based on transmission data and inputs the modulation signal to driver IC 26. Modulation signals are input from driver IC 26 to modulation electrodes 66a and 66b of sub Mach-Zehnder modulator 42a. Modulation signals are input from driver IC 26 to modulation electrodes 66d and 66e of sub Mach-Zehnder modulator 42b. The refractive indices of the arm waveguides change by inputting the modulation signals, thereby the lights are modulated.

The modulated light propagating in arm waveguide 54a and the modulated light propagating in arm waveguide 54b are multiplexed in coupler 62a. The modulated light after multiplexing propagates through arm waveguide 55a of main Mach-Zehnder modulator 44a. The modulated light propagating in arm waveguide 54c and the modulated light propagating in arm waveguide 54d are multiplexed in coupler 62b. The modulated light after multiplexing propagates through arm waveguide 55b of main Mach-Zehnder modulator 44a. The light propagating through arm waveguide 55a and the light propagating through arm waveguide 55b are multiplexed by coupler 64 and propagate through output waveguide 56. The modulated light is emitted from output waveguide 56 to the outside of optical modulator 40a.

Phase control unit 12 of control unit 10 performs automatic bias control using ABC circuit 24 to adjust the phase of light. When ABC circuit 24 applies a voltage to phase adjusting electrode, the refractive index of arm waveguide changes and the optical path length changes. The change of the optical path length changes the phase of light propagating through arm waveguide. Phase control unit 12 can independently control the phase of light in main Mach-Zehnder modulator 44a and the phase of light in each of sub Mach-Zehnder modulators 42a and 42b.

In a state where a modulation signal is not input to sub Mach-Zehnder modulator 42a, a phase shift between light propagating through arm waveguide 54a and light propagating through arm waveguide 54b is π (rad) or π±2πxn (n is a negative or positive integer). That is, sub Mach-Zehnder modulator 42a is adjusted to an extinction point. Sub Mach-Zehnder modulator 42b is also adjusted to the extinction point. The state adjusted to the extinction point is an operating point of sub Mach-Zehnder modulator.

The phase shift between the modulated light propagating in arm waveguide 55a of main Mach-Zehnder modulator 44a and the modulated light propagating in arm waveguide 55b of main Mach-Zehnder modulator 44a is 0.57π (rad) or a value equivalent to 0.57π. Values equivalent to 0.57π are 0.57π±2πxn and 1.57π±2πxn (n is a negative or positive integer). The modulated light propagating in arm waveguide 55a and the modulated light propagating in arm waveguide 55b are orthogonal to each other.

A phase shift φ between two arm waveguides that form a pair such as arm waveguide 52a and arm waveguide 52b is expressed as the sum of an initial phase shift φ0 and a phase change amount Δφ as illustrated in the following equation.

$$\phi=\phi 0+\Delta\phi \qquad \text{[Equation 1]}$$

The initial phase shift φ0 is determined by an optical path length difference between the arm waveguides of optical modulator 40a. A wavelength λ of light in the arm waveguide is, for example, 484 nm (1550 nm in vacuum). Each length of arm waveguides 54a, 54b, 54c and 54d of sub Mach-Zehnder modulators are, for example, 6 mm, which is 10,000 times or more of the wavelength λ. The optical path length of arm waveguide varies due to a manufacturing error or the like. A relationship between an optical path length difference ΔP between the two arm waveguides and the initial phase shift φ0 of light between the two arm waveguides is expressed by the following expression using an integer m.

$$\phi 0+2m\pi=2\pi\times\Delta P/\lambda \qquad \text{[Equation 2]}$$

The optical path length difference ΔP between two arm waveguides paired with each other such as arm waveguide 52a and arm waveguide 52b may be 1/10,000 or more of the designed dimension. In this case, the optical path length difference ΔP is equal to or greater than the light wavelength λ. The initial phase shift φ0 is distributed in a range of 0 (rad) or more and 2 π (rad) or less.

The initial phase shift φ0 may also change during operation of light transmission apparatus 100. This is because the optical path length of the arm waveguide changes due to physical stresses applied to the optical modulator 40a and temperature changes. A change amount of the initial phase shift φ0 during operation ranges from −2π to 2π, for example.

The phase change amount Δφ is the phase change amount of light propagating through the arm waveguide. The phase change amount Δφ is adjusted by applying a voltage from ABC circuit 24 to the phase adjusting electrode and changing the optical path length of the arm waveguide. In response to the initial phase shift φ0, phase control unit 12 changes the voltage applied from ABC circuit 24 to the phase adjusting electrode (automatic bias control). The phase change amount in the automatic bias control is determined in consideration of the initial phase shift and the phase change during operation.

When the voltage applied to phase adjusting electrode is swept, a range in which the phase change amount is changed is defined as a phase adjusting range. In order to adjust the operating points of sub Mach-Zehnder modulators 42a and 42b to the extinction points, the phase adjusting range of each of sub Mach-Zehnder modulators 42a and 42b is preferably, for example, a range of 6π from −3π to 3π. In order to make the phases of the two modulated lights in main Mach-Zehnder modulator 44a orthogonal to each other, the phase adjusting range of main Mach-Zehnder modulator 44a is preferably, for example, a range of 5π from −2.5π to 2.5π. (Voltage)

The voltage applied to sub Mach-Zehnder modulator 42a by ABC circuit 24 will be described. A voltage Vp applied to phase adjusting electrode 68a on arm waveguide 54a is expressed as follows using a central voltage Vcc (first voltage) and a differential voltage Vdc (second voltage).

$$Vp=Vcc+Vdc \qquad \text{[Equation 3]}$$

A voltage Vn applied to phase adjusting electrode 68b on arm waveguide 54b is expressed by the following equation.

$$Vn=Vcc-Vdc \qquad \text{[Equation 4]}$$

The difference between the voltage Vp and the voltage Vn is 2Vdc. Phase control unit 12 fixes the central voltage Vcc to a fixed value and changes the differential voltage Vdc, thereby changing the voltages Vp and Vn so that the operating point of sub Mach-Zehnder modulator 42a is adjusted. The voltage Vp is applied to phase adjusting electrode 68d of sub Mach-Zehnder modulator 42b, and the voltage Vn is applied to phase adjusting electrode 68e.

The voltage applied to main Mach-Zehnder modulator 44a by ABC circuit 24 will be described. A voltage VI applied to phase adjusting electrode 70a on arm waveguide 55a is expressed as follows using a central voltage Vcp (first voltage) and a differential voltage Vdp (second voltage).

$$VI=Vcp+Vdp \qquad \text{[Equation 5]}$$

A voltage VQ applied to phase adjusting electrode 55b on arm waveguide 70b is expressed by the following equation.

$$VQ=Vcp-Vdp \qquad \text{[Equation 6]}$$

The difference between the voltage VI and the voltage VQ is 2 Vdp. Phase control unit 12 fixes the central voltage Vcp to a fixed value and changes the differential voltage Vdp, thereby changing the voltages VI and VQ so that the operating point of main Mach-Zehnder modulator 44a is adjusted.

The magnitude of the voltage will be described by taking the voltages Vp and Vn of the sub Mach-Zehnder modulator as an example. The minimum values of the voltages Vp and Vn are defined as Vmin, and the maximum values thereof are defined as Vmax. The wider the adjusting range of the differential voltage Vdc, the wider the phase adjusting range. In order to widen the adjusting range of the differential voltage Vdc, the central voltage Vcc and the differential voltage Vdc are defined as follows, for example.

$$Vcc=(V\min+V\max)/2$$

Adjusting range of Vdc: range of Vmax−Vmin, from −(Vmax−Vmin)/2 to (Vmax−Vmin)/2. The minimum value Vmin and the maximum value Vmax are determined according to, for example, the power consumption and the breakdown voltage of optical modulator 40. In the case of Vmin=0 V and Vmax=20 V, Vcc is equal to 10 V. The range of the differential voltage Vdc is from −10 V to 10 V (−Vcc≤Vdc≤Vcc). The voltages applied to sub Mach-Zehnder modulator 42b and main Mach-Zehnder modulator 44a can be set in the same manner as described above.

Figure 3:
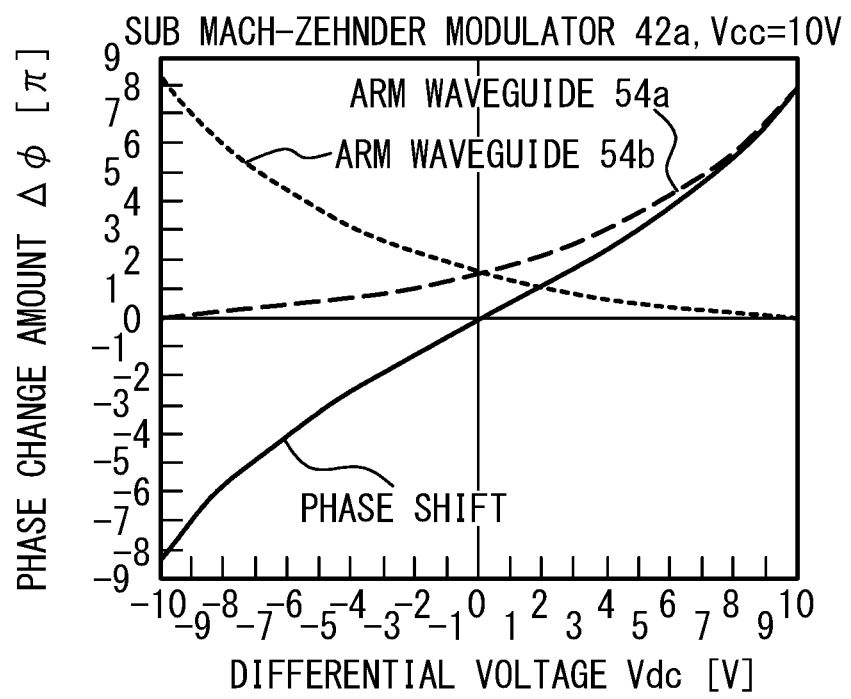
FIG. 3 is a diagram illustrating a relationship between a differential voltage and a phase change amount in a sub Mach-Zehnder modulator.

FIG. 3 is a diagram illustrating a relationship between a differential voltage and a phase change amount Δφ in sub Mach-Zehnder modulator 42a. The horizontal axis represents the differential voltage Vdc, and the vertical axis represents the phase change amount Δφ. The dashed line represents the phase change amount in arm waveguide 54a. The dotted line represents the phase change amount in arm waveguide 54b. The solid line represents the phase change amount of sub Mach-Zehnder modulator 42a. The phase change amount in sub Mach-Zehnder modulator 42a is a phase shift between the arm waveguides (phase change amount in arm waveguide 54a minus phase change amount in arm waveguide 54b). The central voltage Vcc is 10 V and the differential voltage Vdc ranges from −10 V to 10 V.

As illustrated in FIG. 3, as the differential voltage Vdc increases to the positive side, the phase change amount in arm waveguide 54a increases to the positive side. The phase change amount in arm waveguide 54b approaches 0. The phase change amount (phase shift) indicated by the solid line increases to the positive side. As the differential voltage Vdc increases to the negative side, the phase change amount in arm waveguide 54b increases to the positive side, the phase change amount in arm waveguide 54a approaches 0, and the phase shift increases to the negative side. When the differential voltage Vdc ranges from −10 V to 10 V, the phase shift ranges from approximately −9π to 9π.

In the case of FIG. 3, the range of the phase change amount Δφ (phase adjusting range) of sub Mach-Zehnder modulator 42a is approximately in the range of −9π to 9π, and exceeds the phase adjusting range 6π required for sub Mach-Zehnder modulator which is from −3π to 3π. In order to reduce the power consumption and set the phase adjusting range to a predetermined magnitude, the central voltage Vc is set to a value lower than 10 V, for example, 7 V. The differential voltage Vdc may range from −7 V to 7 V.

In each Mach-Zehnder modulator, variation may occur in the phase adjusting efficiency which represents the rate of change of the phase with respect to the voltage. The difference in the phase adjusting efficiency is believed to be due to variations in the amount of thermal diffusion of dopants doped in cladding layers 82 and 86, and in contact layer 88. The difference in the amount of thermal diffusion of the dopant causes a difference in the intensity of an electric field generated in core layer 84 when a voltage is applied. When there is a difference in the intensity of the electric field, there is also a difference in refractive index, and the phase change amount also has a different magnitude. Since the band gap energy also varies due to the variation in the thermal diffusion amount of the dopant, the phase change amount also changes.

Variations in the phase adjusting efficiency may occur between sub Mach-Zehnder modulator 42a and sub Mach-Zehnder modulator 42b within one optical modulator 40a. In addition, variations in the phase adjusting efficiency may occur among the plurality of optical modulators 40a.

Figure 4A:
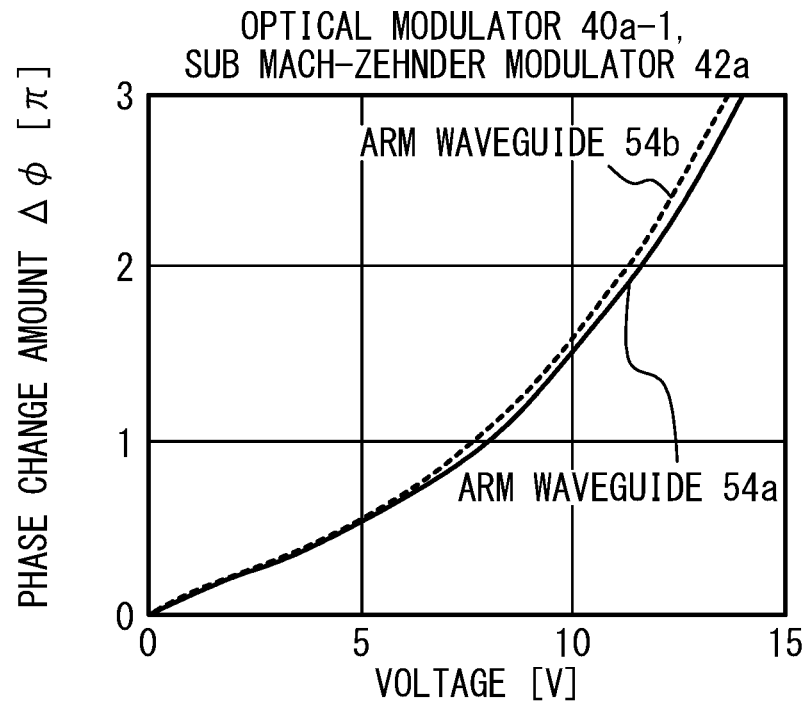
FIG. 4A is a diagram illustrating a relationship between a voltage and a phase change amount.
Figure 4B:
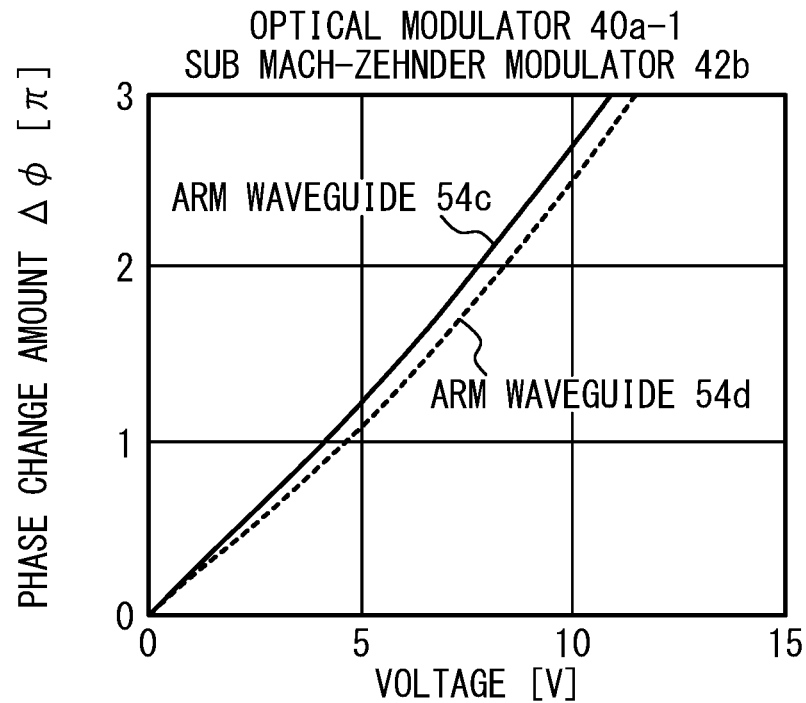
FIG. 4B is a diagram illustrating a relationship between a voltage and a phase change amount.

Take two optical modulators 40a-1 and 40a-2 as an example. Each of optical modulators 40a-1 and 40a-2 has the configuration illustrated in FIG. 2A. First, the phase adjusting efficiency between the sub Mach-Zehnder modulators will be described. FIG. 4A and FIG. 4B are diagrams illustrating relationships between voltages and phase change amounts. The horizontal axes represent voltages (Vp and Vn) applied to phase adjusting electrodes of sub Mach-Zehnder modulators. The vertical axes represent the phase change amount in the arm waveguides.

FIG. 4A illustrates relationships between voltages and phase change amounts in the arm waveguides of sub Mach-Zehnder modulator 42a of optical modulator 40a-1. The solid line represents the phase change amount of arm waveguide 54a which is the arm waveguide of the p-side. The dotted line represents the phase change amount of arm waveguide 54b which is the arm waveguide of the n-side. FIG. 4B illustrates relationships between voltages and phase change amounts in the arm waveguides of sub Mach-Zehnder modulator 42b of optical modulator 40a-1. The solid line represents the phase change amount of arm waveguide 54c on the p-side. The dotted line represents the phase change amount of arm waveguide 54d on the n-side. Due to the difference in the phase adjusting efficiency, the phase change amount of the arm waveguide on the p-side is slightly different from the phase change amount of the arm waveguide on the n-side in each of FIG. 4A and FIG. 4B. The difference in the phase change amount between the sub Mach-Zehnder modulators is larger than the difference in the difference in the phase change amount between the arm waveguides.

When the same voltage is applied in FIG. 4A and FIG. 4B, the phase change amount $\Delta\varphi$ in FIG. 4A is small and the phase change amount $\Delta\varphi$ in FIG. 4B is large. For example, at the voltage of 10 V, the phase change amounts $\Delta\varphi$ of the two arm waveguides 54a and 54b in FIG. 4A are about $1.5\pi$. At the voltage of 10 V, the phase change amounts $\Delta\varphi$ of the two arm waveguides 54c and 54d in FIG. 4B are about $2.5\pi$. The phase adjusting efficiency of sub Mach-Zehnder modulator 42b illustrated in FIG. 4B is higher than the phase adjusting efficiency of sub Mach-Zehnder modulator 42a illustrated in FIG. 4A. As described above, in the same optical modulator 40a-1, the phase adjusting efficiencies vary due to a variation in thermal diffusions of dopants.

Figure 5A:
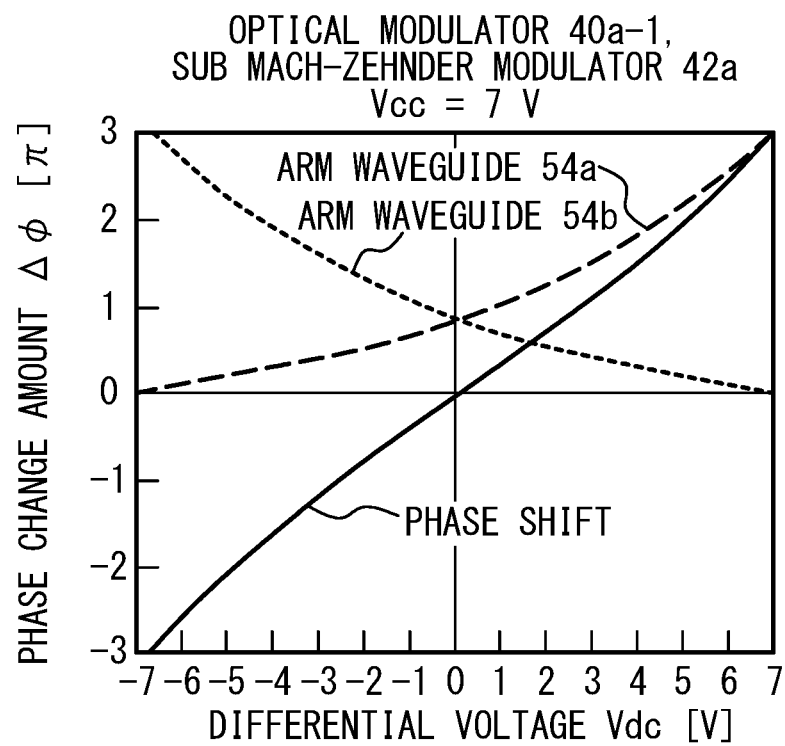
FIG. 5A is a diagram illustrating a relationship between a differential voltage and a phase change amount.
Figure 5B:
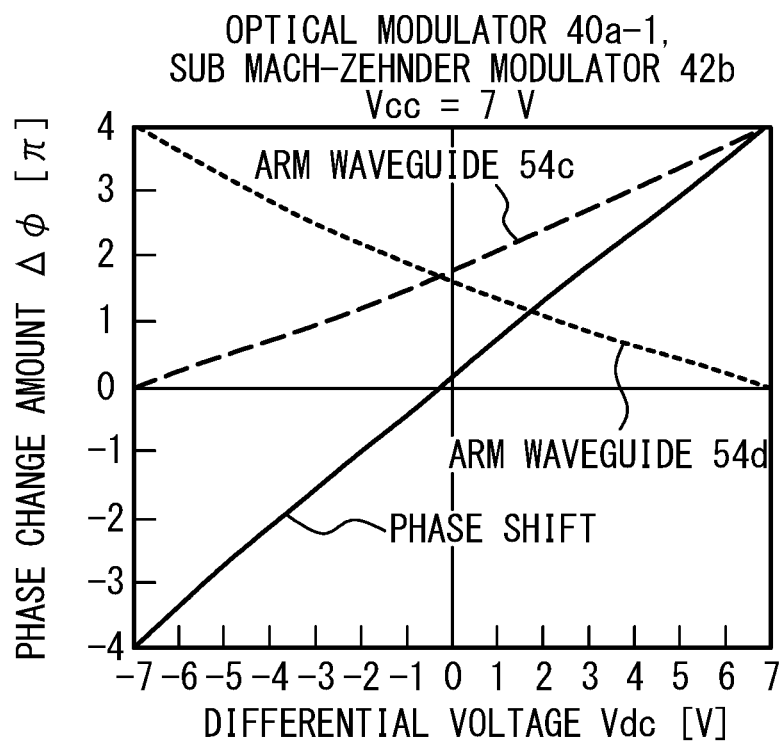
FIG. 5B is a diagram illustrating a relationship between a differential voltage and a phase change amount.

FIG. 5A and FIG. 5B are diagrams illustrating relationships between differential voltages and phase change amounts. The horizontal axes represent the differential voltages Vdc. The vertical axes represent phase change amounts $\Delta\varphi$. The central voltage Vcc is 7 V.

FIG. 5A illustrates the phase change amount in sub Mach-Zehnder modulator 42a of optical modulator 40a-1. The dashed line represents the phase change amount of arm waveguide 54a on the p-side. The dotted line represents the phase change amount of arm waveguide 54b on the n-side. The solid line indicates the phase change amount (phase shift between arm waveguides) in sub Mach-Zehnder modulator 42a. Since sub Mach-Zehnder modulator 42a is differentially driven, the phase change amount is symmetrical with respect to Vdc=0. When the differential voltage Vdc is swept from −7 V to 7 V, the phase change amount is −3 $\pi$ or more and 3 $\pi$ or less.

FIG. 5B illustrates the phase change amount in sub Mach-Zehnder modulator 42b of optical modulator 40a-1. The dashed line represents the phase change amount of arm waveguide 54c on the p-side. The dotted line represents the phase change amount of arm waveguide 54d on the n-side. The solid line represents the phase change amount in sub Mach-Zehnder modulator 42b. The phase adjusting efficiency of sub Mach-Zehnder modulator 42b is higher than that of sub Mach-Zehnder modulator 42a. Therefore, the phase change amount in FIG. 5B is larger than that in FIG. 5A, and is equal to or larger than −4 $\pi$ and equal to or smaller than $4\pi E$.

Even in sub Mach-Zehnder modulator 42a having a small phase adjusting efficiency, in order to set the range of the phase change amount (phase adjusting range) to a predetermined magnitude of −3 $\pi$ or more and 3 $\pi$ or less, as illustrated in FIG. 5A, the central voltage may be set to Vcc=7 V and the differential voltage Vdc may be set to a range from −7 V to 7 V. However, as illustrated in FIG. 5B, the phase adjusting range of sub Mach-Zehnder modulator 42b having a large phase adjusting efficiency becomes $8\pi$ from −4$\pi$ to 4$\pi$, which exceeds the predetermined range of 6$\varphi$. The absorption loss of light increases.

There is a positive correlation between the phase adjusting efficiency and the absorption loss of light in the arm waveguide. This is because a Kramers-Kronig relationship is applicable between the change in the refractive index of arm waveguide and the amount of light absorption. The smaller the phase adjusting efficiency, the smaller the absorption loss. The greater the phase adjusting efficiency, the greater the absorption loss.

Figure 6A:
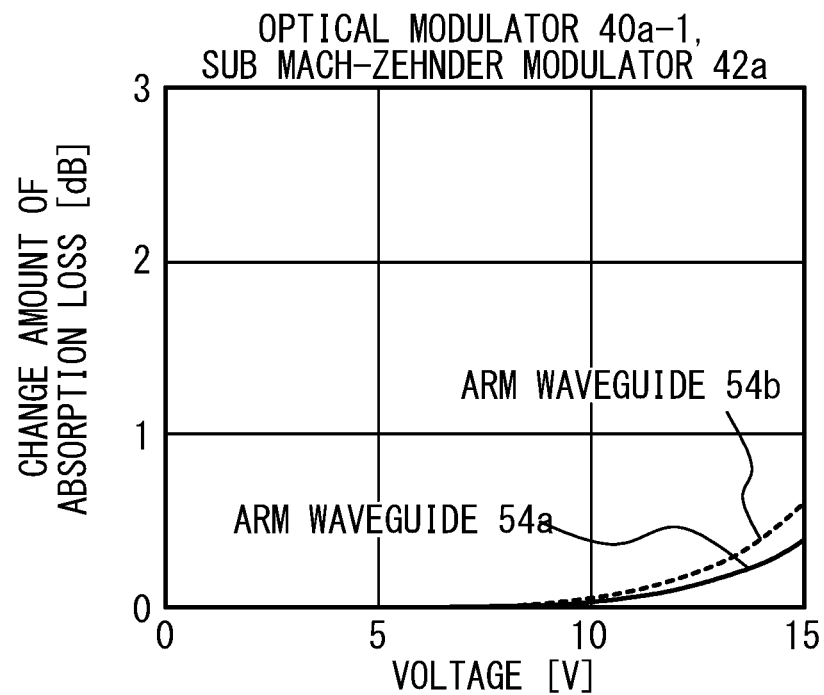
FIG. 6A is a diagram illustrating a relationship between a voltage and a change amount of light absorption loss.
Figure 6B:
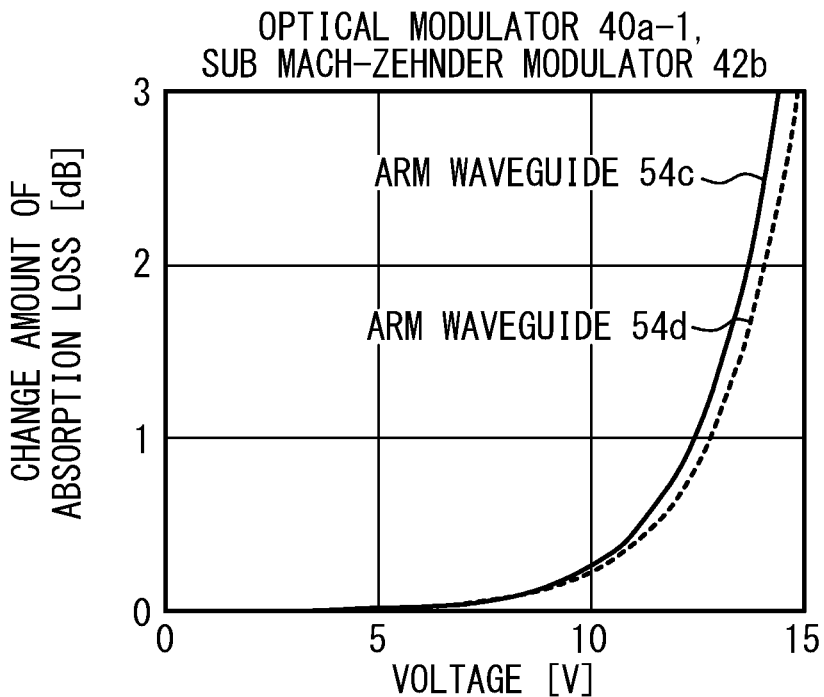
FIG. 6B is a diagram illustrating a relationship between a voltage and a change amount of light absorption loss.

FIG. 6A and FIG. 6B are diagrams illustrating relationships between voltages and change amounts of absorption losses of light. The horizontal axes represent voltages (Vp and Vn) applied to phase adjusting electrodes of the sub Mach-Zehnder modulators. The vertical axes represent change amounts of absorption losses of light.

FIG. 6A illustrates the change amounts of absorption losses in the arm waveguides of sub Mach-Zehnder modulator 42a of optical modulator 40a-1. The solid line represents the change amount of absorption loss of arm waveguide 54a on the p-side. The dotted line represents the change amount of absorption loss of arm waveguide 54b on the n-side.

FIG. 6B illustrates the change amounts of absorption losses in the arm waveguides of sub Mach-Zehnder modulator 42b of optical modulator 40a-1. The solid line represents the change amount of absorption loss of arm waveguide 54c on the p-side. The dotted line represents the change amount of absorption loss of arm waveguide 54d on the n-side.

When the same voltage is applied in FIG. 6A and FIG. 6B, the change amount of absorption loss in FIG. 6A is small and the change amount of absorption loss in FIG. 6B is large. For example, when the voltage is 15 V, the change amount of absorption loss in FIG. 6A is less than 1 dB, while the change amount of absorption loss in FIG. 6B exceeds 3 dB. The absorption loss increases non-linearly with respect to the voltage, and increases greatly as the voltage increases.

In both sub Mach-Zehnder modulator 42b having the large phase adjusting efficiency and sub Mach-Zehnder modulator 42a having the small phase adjusting efficiency, the phase adjusting range is set to a predetermined magnitude of, for example, 6$\pi$ ranging from −3$\pi$ to 3$\pi$. For this purpose, for both sub Mach-Zehnder modulators 42a and 42b, the central voltage Vcc may be set to 7 V and the differential voltage Vdc may be set to a range from −7 V to 7 V. However, as illustrated in FIG. 5B, the phase adjusting range of sub Mach-Zehnder modulator 42b exceeds the predetermined range of 6$\pi$. The change amount of absorption loss of sub Mach-Zehnder modulator 42b illustrated in FIG. 6B is larger than that of sub Mach-Zehnder modulator 42a. That is, if the voltage is determined in accordance with sub Mach-Zehnder modulator 42a having the small phase adjusting efficiency, the phase adjusting range becomes excessive and the absorption loss increases in sub Mach-Zehnder modulator 42b having the large phase adjusting efficiency. The insertion loss of light increases, and the extinction ratio decreases as described later.

In FIG. 4A to FIG. 6B, two sub Mach-Zehnder modulators 42a and sub Mach-Zehnder modulator 42b in one optical modulator 40a-1 have been described. The plurality of optical modulators also have different phase adjusting efficiencies.

Optical modulator 40a-2 is another optical modulator different from optical modulator 40a-1. It is assumed that sub Mach-Zehnder modulator 42a of optical modulator 40a-2 has almost the same phase adjusting efficiency and absorption loss as sub Mach-Zehnder modulator 42a of optical modulator 40a-1 (see FIG. 4A, FIG. 5A, and FIG. 6A). It is assumed that sub Mach-Zehnder modulator 42b of optical modulator 40a-2 has almost the same phase adjusting efficiency and absorption loss as sub Mach-Zehnder modulator 42b of optical modulator 40a-1 (see FIG. 4B, FIG. 5B, and FIG. 6B). Main Mach-Zehnder modulator 44a of optical modulator 40a-2 has higher phase adjusting efficiency and larger absorption loss compared to main Mach-Zehnder modulator 44a of optical modulator 40a-1.

Figure 7A:
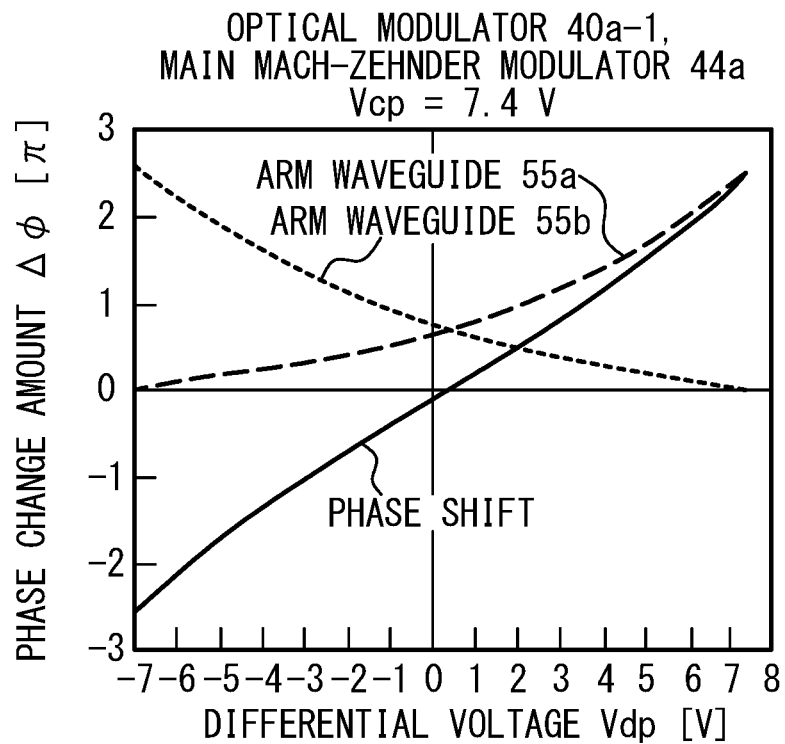
FIG. 7A is a diagram illustrating a relationship between a differential voltage and a phase change amount.
Figure 7B:
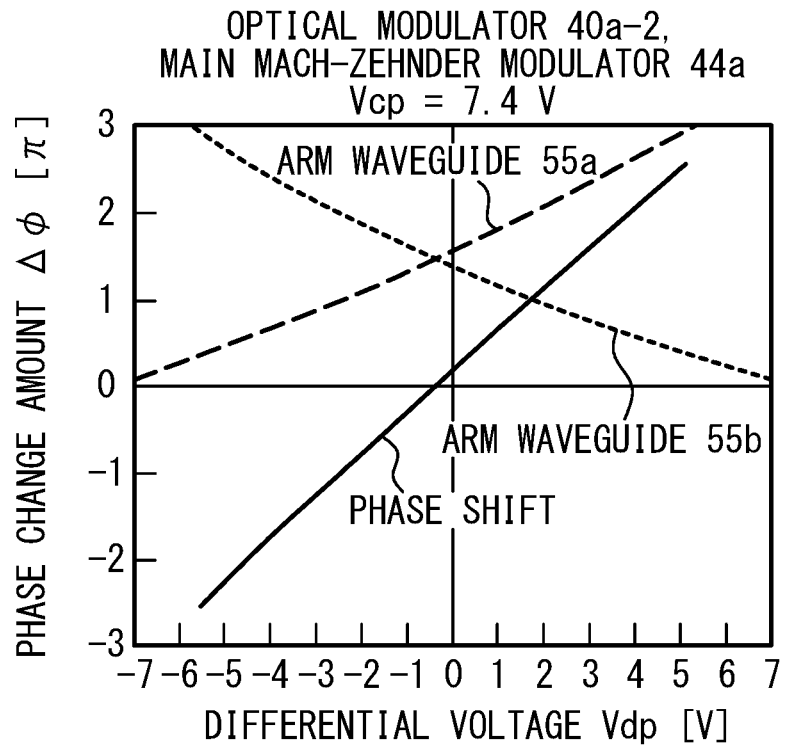
FIG. 7B is a diagram illustrating a relationship between a differential voltage and a phase change amount.

FIG. 7A and FIG. 7B are diagrams illustrating relationships between differential voltages and phase change amounts. The horizontal axes represent the differential voltages Vdp. The vertical axes represent phase change amount $\Delta\varphi$. The central voltage Vcp is 7.4 V.

FIG. 7A illustrates the phase change amount in main Mach-Zehnder modulator 44a of optical modulator 40a-1. The dashed line represents the phase change amount of arm waveguide 55a on the Ich side. The dotted line represents the phase change amount of arm waveguide 55b on the Qch side. The solid line represents the phase change amount in main Mach-Zehnder modulator 44a (phase change amount of arm waveguide 55a minus phase change amount of arm waveguide 55b). When the differential voltage Vdc ranges from −7 V to 7.4 V, the phase change amount ranges from −2.5π to 2.5π.

FIG. 7B illustrates the phase change amount in main Mach-Zehnder modulator 44a of optical modulator 40a-2. The phase adjusting efficiency of main Mach-Zehnder modulator 44a of optical modulator 40a-2 is higher than that of main Mach-Zehnder modulator 44a of optical modulator 40a-1. In case the differential voltage Vdc ranges from −5.5 V to 5.1 V, the phase change amount ranges from −2.5π to 2.5π. The phase change amount in FIG. 7G is larger than that in FIG. 7A. For example, if Vdp is equal to 4 V, the phase change amount in FIG. 7A is approximately π, while the phase change amount in FIG. 7B is approximately 2π.

As described above, there is a positive correlation between the phase adjusting efficiency and the absorption loss of light in the arm waveguide. Compared with main Mach-Zehnder modulator 44a of optical modulator 40a-1, main Mach-Zehnder modulator 44a of optical modulator 40a-2 has high phase adjusting efficiency and large absorption loss. If the voltage is determined in accordance with main Mach-Zehnder modulator 44a of optical modulator 40a-1 having the small phase adjusting efficiency, the phase adjusting range becomes larger than the predetermined range (5π) and the absorption loss increases in main Mach-Zehnder modulator 44a of optical modulator 40a-2 having the large phase adjusting efficiency.

In the single optical modulator 40a-1, there is a difference in phase adjusting efficiency between the sub Mach-Zehnder modulators. There is also a difference in phase adjusting efficiency between optical modulator 40a-1 and optical modulator 40a-2. In order to set the phase change amount to a predetermined value and suppress an increase in light absorption loss, it is preferable to optimize the voltage applied to phase adjusting electrode for each Mach-Zehnder modulator.

(Manufacturing Method)

Figure 8:
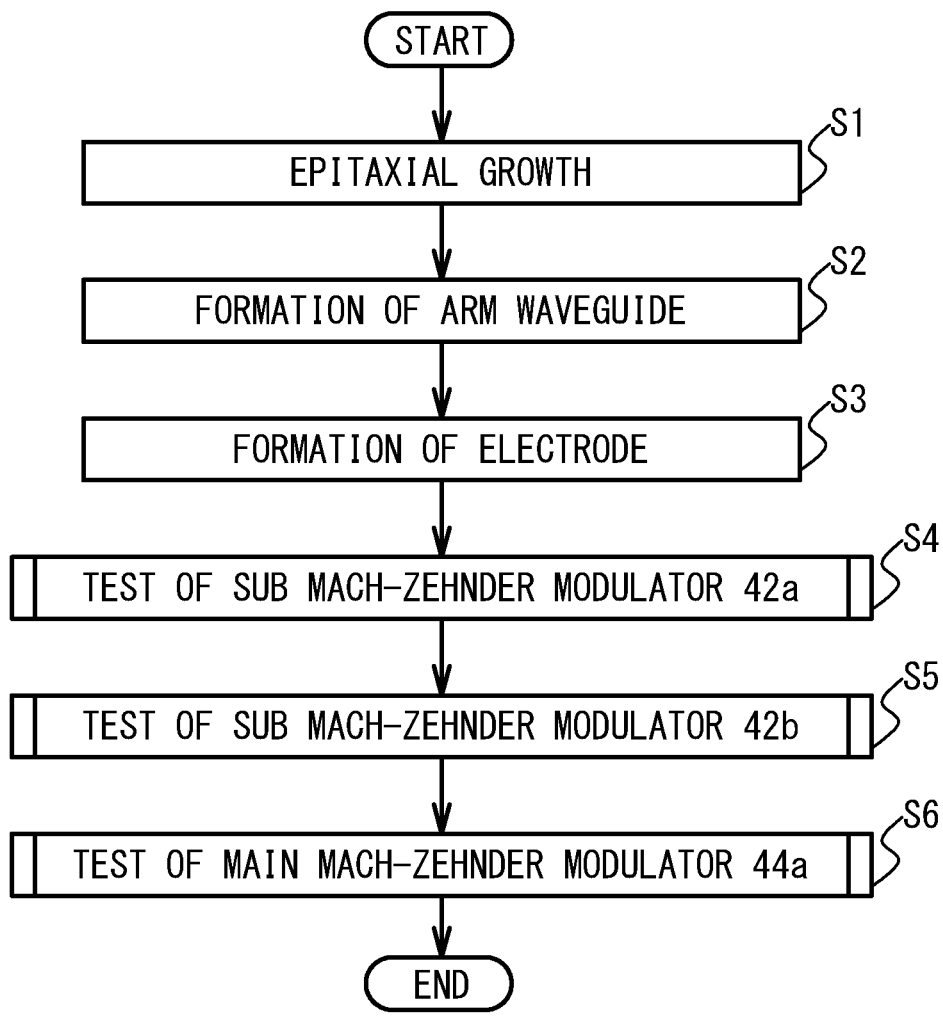
FIG. 8 is a flowchart illustrating a method for manufacturing an optical modulator.

FIG. 8 is a flow chart illustrating a method for manufacturing optical modulator 40a, including the step of optimizing the voltage. As illustrated in FIG. 8, a Mach-Zehnder modulator is formed (steps S1 to S3). A cladding layer 82, a core layer 84, a cladding layer 86, and a contact layer 88 are epitaxially grown on an upper surface of a wafer (semiconductor substrate 80) by a metal organic chemical vapor deposition (MOCVD) method or the like. The n-type cladding layer 82, the p-type cladding layer 86, and contact layer 88 are formed by adding a dopant to the source gas (step S1). When the amount of thermal diffusion of the dopant varies, the phase adjusting efficiency also varies as illustrated in FIG. 4A and FIG. 4B, and FIG. 7A and FIG. 7B.

A mesa-shaped arm waveguide as illustrated in FIG. 2B is formed by dry etching or the like (step S2). Insulating film 81 and resin layer 85 are formed. Openings are formed in insulating film 81 and resin layer 85 by dry etching or the like. Electrodes (modulation electrode, phase adjusting electrode and ground electrode) are formed by vacuum evaporation or the like (step S3). Sub Mach-Zehnder modulators 42a and 42b and main Mach-Zehnder modulator 44a are formed on semiconductor substrate 80. The wafer is diced to form a plurality of optical modulators 40a.

Each of the plurality of optical modulators 40a is disposed on substrate 41, and is electrically connected to ABC circuit 24 and driver IC 26. Testing is performed for each optical modulator 40a. Specifically, sub Mach-Zehnder modulator 42a is tested and the voltages applied to phase adjusting electrodes 68a and 68b are optimized (step S4). Testing of sub Mach-Zehnder modulator 42b is performed, and the voltages applied to phase adjusting electrodes 68d and 68e are optimized (step S5). Main Mach-Zehnder modulator 44a is tested to optimize the voltages applied to phase adjusting electrodes 70a and 70b (step S6). Optical modulator 40a is formed by the above steps.

(Testing)

Figure 9:
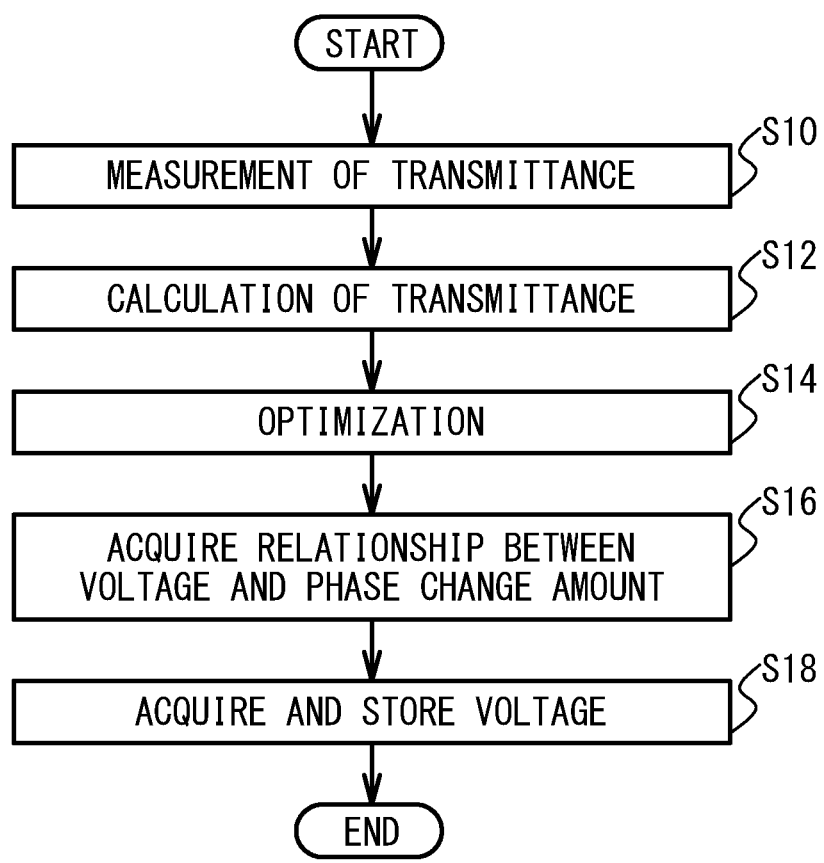
FIG. 9 is a flow chart illustrating a testing.

FIG. 9 is a flow chart illustrating the testing. Each of steps S4, S5 and S6 in FIG. 8 is a step of performing the testing illustrated in FIG. 9.

First, testing of optical modulator 40a-1 among the plurality of optical modulators 40a will be described. In optical modulator 40a-1, the testing of sub Mach-Zehnder modulator 42a, the testing of sub Mach-Zehnder modulator 42b, and the testing of main Mach-Zehnder modulator 44a are sequentially performed.

In the testing of sub Mach-Zehnder modulator 42a (step S4 in FIG. 8), phase control unit 12 of control unit 10 applies a voltage to phase adjusting electrode 68b of sub Mach-Zehnder modulator 42b to adjust the operating point of sub Mach-Zehnder modulator 42b to the extinction point. Laser control unit 14 of control unit 10 drives wavelength tunable laser element 22 and causes light to enter optical modulator 40a-1 from wavelength tunable laser element 22. A light receiving element (not illustrated) receives light emitted from sub Mach-Zehnder modulator 42a. Control unit 10 measures the light transmittance in the arm waveguide by comparing the intensity of the incident light with the intensity of the emitted light.

Control unit 10 measures the light transmittance (first transmittance) in arm waveguide 54a of sub Mach-Zehnder modulator 42a while sweeping the voltage applied from ABC circuit 24 to phase adjusting electrode 68a of sub Mach-Zehnder modulator 42a. Control unit 10 measures the light transmittance (first transmittance) in arm waveguide 54b of sub Mach-Zehnder modulator 42a while sweeping the voltage applied from ABC circuit 24 to phase adjusting electrode 68b (step S10 in FIG. 9). Calculation unit 15 of control unit 10 calculates the light transmittance (second transmittance) in arm waveguide 54a and the light transmittance (second transmittance) in arm waveguide 54b (step S12).

Calculation unit 15 performs optimization of the transmittance so that the transmittance calculated in step S12 approaches the transmittance measured in step S10 (step S14). Based on the optimization of the transmittance, calculation unit 15 acquires a relationship between the voltage applied to the phase adjusting electrode and the phase change amount in the arm waveguide (step S16). Storage control unit 18 acquires, based on the relationship between the voltage and the phase change amount, a voltage in which the phase adjusting range of sub Mach-Zehnder modulator 42a has a predetermined magnitude, and then storage control unit 18 stores the voltage in, for example, storage device 34 (step S18).

Testing will be specifically described. Calculation unit 15 calculates the transmittance T as a function of the change amount ΔL1 of absorption loss, the initial phase shift φ0, and the phase change amount Δφ. Calculation unit 15 calculates the phase change amount Δφ in one arm waveguide as a function of the voltage V applied to the phase adjusting electrode as expressed in the following equation.

$$\Delta\phi = k1 \times V + k2 \times V^2 + k3 \times V^3 + k4 \times V^4 + k5 \times V^5 + k6 \times V^6 \qquad \text{[Equation 7]}$$

An example of the initial values of the coefficients is illustrated below.

$$k1=3\times10^{-1}(\pi/V), k2=3\times10^{-2}(\pi/V^2), k3=3\times10^{-3}(\pi/V^3),$$
$$k4=1\times10^{-4}(\pi/V^4),$$

$$k5=1\times10^{-6}(\pi/V^5), \text{ and } k6=1\times10^{-8}(\pi/V^6)$$

Figure 10A:
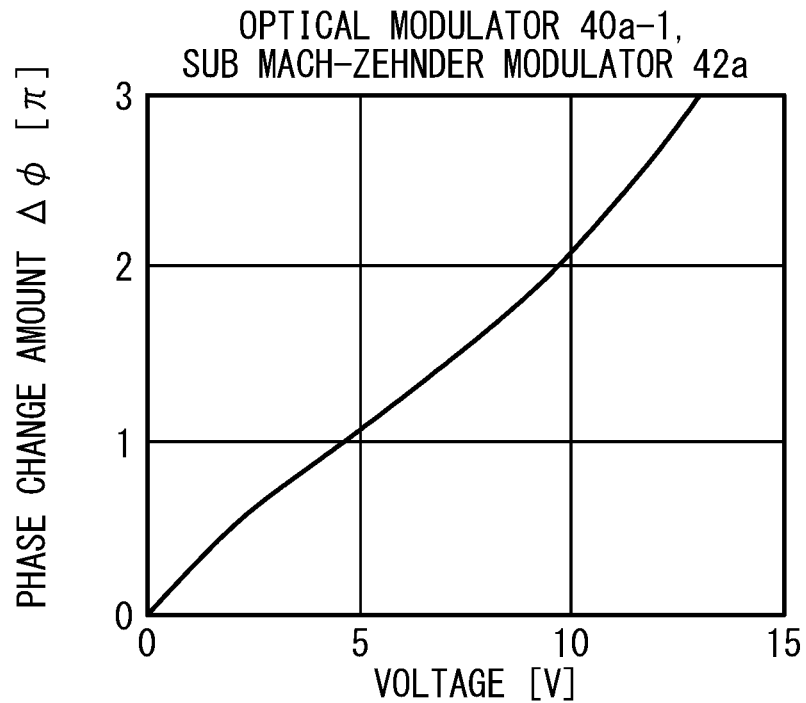
FIG. 10A is a diagram illustrating a calculated phase change amount.

FIG. 10A is a diagram illustrating a calculated phase change amount.

The horizontal axis represents the voltage applied to phase adjusting electrodes 68a and 68b of sub Mach-Zehnder modulator 42a. The vertical axis represents the phase change amount Δφ. The solid line represents the phase change amount of arm waveguide (arm waveguide 54a) on the p-side and the phase change amount of arm waveguide (arm waveguide 54b) on the n-side. Since calculation unit 15 performs calculation using the same function (equation 7) and the same coefficient (initial value) for arm waveguides 54a and 54b, the phase change amount Δφ is also equal between arm waveguides.

Calculation unit 15 calculates the change amount ΔL1 of the absorption loss of light in the arm waveguide as a function of the voltage V applied to the phase adjusting electrode as in the following equation.

$$\Delta L1 = a1 \times (1 - \exp(-V/a2)) \qquad \text{[Equation 8]}$$

The initial values of the coefficients a1 and a2 are illustrated below.

$$a1=1\times10^{-3} \text{ (dB)}, a2=2(V).$$

Figure 10B:
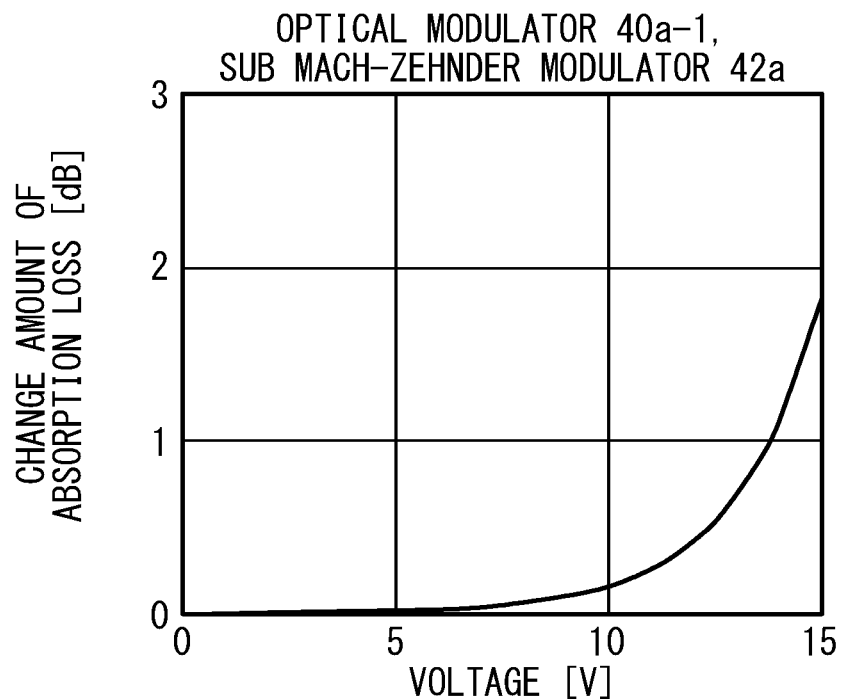
FIG. 10B is a diagram illustrating a calculated change amount of absorption loss.

FIG. 10B is a diagram illustrating a calculated change amount of absorption loss. The horizontal axis represents the voltage applied to phase adjusting electrodes 68a and 68b of sub Mach-Zehnder modulator 42a. The vertical axis represents the change amount ΔL1 of absorption loss. Since the calculation is performed using the same function (Equation 8) and the same coefficient for arm waveguides 54a and 54b, the change amounts ΔL1 of the absorption loss of light in the arm waveguides are also the same as each other as indicated by the solid line.

Calculation unit 15 calculates the transmittance T (step S12). The transmittance Tin each arm waveguide is expressed as a function of the change amount ΔL1 of absorption loss, the initial phase shift φ0, and the phase change amount Δφ.

$$T = (1 + 10^{\wedge}(\Delta L1/10) + 2 \times 10^{\wedge}(\Delta L1/20) \times \cos(\phi 0 \pm \Delta\phi))/(1 + 10^{\wedge}(\Delta L1/10))^2 \qquad \text{[Equation 9]}$$

The phase change amount Δφ is expressed by Equation 7. The change amount ΔL1 of absorption loss is expressed by Equation 8. The sign in the cosine function "cos" of Equation 9 is positive for the arm waveguide on the p-side and negative for the arm waveguide on the n-side. The initial phase shift φ0 is expressed by the following equation. In Equation 10, "acos" is an inverse cosine function.

$$\phi 0 \pm a \cos(T0^{0.5}) \qquad \text{[Equation 10]}$$

T0 is the transmittance when the applied voltage is 0 V and is measured in step S10. When the voltage applied to phase adjusting electrode 68a is swept, the sign of the initial phase shift φ0 is positive in case the first peak of the transmittance is the minimum peak, and is negative in case the first peak is the maximum peak. In the example of sub Mach-Zehnder modulator 42a, φ0 is equal to 0.28π.

Figure 11A:
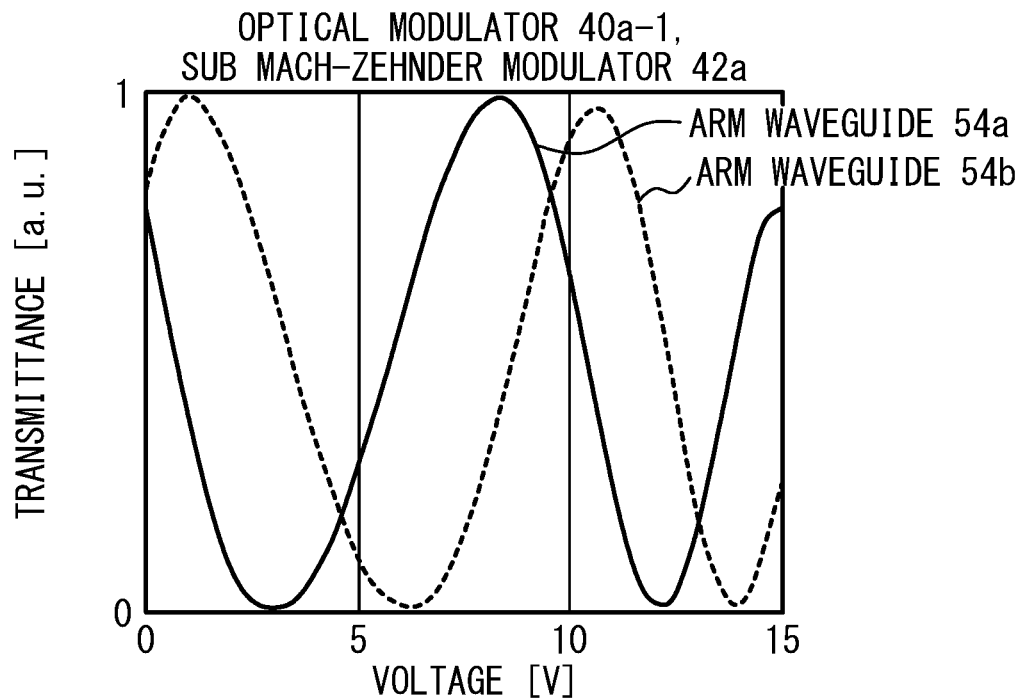
FIG. 11A is a diagram illustrating calculated transmittances.
Figure 11B:
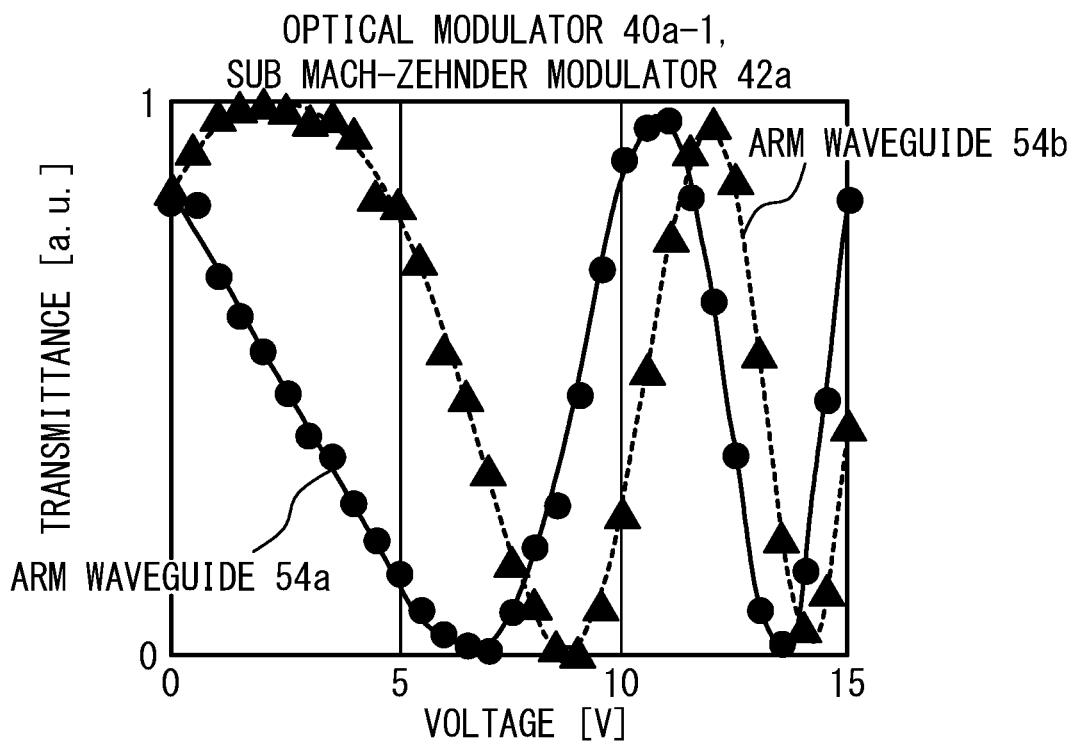
FIG. 11B is a diagram illustrating a measured transmittance and a transmittance after optimization.

FIG. 11A is a diagram illustrating calculated transmittances. FIG. 11B is a diagram illustrating measured transmittances and transmittances after optimization. The horizontal axes in FIG. 11A and FIG. 11B represent the voltage applied to the phase adjusting electrode of sub Mach-Zehnder modulator 42a. The vertical axes represent light transmittances.

The solid line in FIG. 11A represents the transmittance of the arm waveguide (arm waveguide 54a) on the p-side. The dotted line represents the transmittance of the arm waveguide (arm waveguide 54b) on the n-side. The transmittances illustrated in FIG. 11A are calculated by calculation unit 15 using Equation 9 and the initial value in step S12 of FIG. 9. The solid line in FIG. 11B represents the transmittance after optimization of arm waveguide 54a. The dotted line represents the transmittance after optimization of arm waveguide 54b. Circles represent the measurement result of the transmittance of arm waveguide 54a. Triangles represent the measurement result of the transmittance of arm waveguide 54b.

The optimization in step S14 in FIG. 9 means that the transmittance calculated in step S12 is brought close to the transmittance measured in step S10 to reduce the error therebetween. The transmittance illustrated by the solid line in FIG. 11B varies from the transmittance illustrated by the solid line in FIG. 11A and approaches the measured transmittance illustrated by the circles in FIG. 11B. The transmittance illustrated in dotted lines in FIG. 11B varies from the transmittance illustrated in dotted lines in FIG. 11A and approaches the measured transmittance illustrated in the triangles in FIG. 11B.

By optimizing the transmittance, the initial phase shift φ0, the phase change amount Δφ, and the change amount ΔL1 of the absorption loss included in the expression (Equation 9) of the transmittance are also optimized. The phase change amount Δφ and the absorption loss change amount ΔL1 are functions indicating more accurately the relationship with the voltage (step S16 in FIG. 9).

More specifically, the initial values of the coefficients k1 to k6 in the Equation 7 of the phase change amount Δφ and the coefficients a1 and a2 in the Equation 8 of the change amount ΔL1 change. The coefficients after optimization are illustrated below.

Coefficients for arm waveguide 54a $$k1=1.32\times10^{-1}(\pi/V), k2=1.90\times10^{-2}(\pi/V^2), k3=3.33\times10^{-3}(\pi/V^3), k4=1.43\times10^{-4}(\pi/V^4),$$

$$k5=9.50\times10^{-7}(\pi/V^5), k6=9.50\times10^{-8}(\pi/V^6), a1=1\times10^{-3} \text{ (dB)}, a2=2.5(V)$$

Coefficients for arm waveguide 54b $k1=1.40\times10^{-1}(\pi/V), k2=2.00\times10^{-2}(\pi/V^2), k3=3.50\times10^{-3}(\pi/V^3), k4=1.50\times10^{-4}(\pi/V^4),$ $k5=1.00\times10^{-6}(\pi/V^5), k6=1.00\times10^{-7}(\pi/V^6), a1=1.2\times10^{-3}$ (dB), $a2=2.4(V)$ The initial phase shift ϕ0 after optimization of transmittance is 0.25π.

Figure 12A:
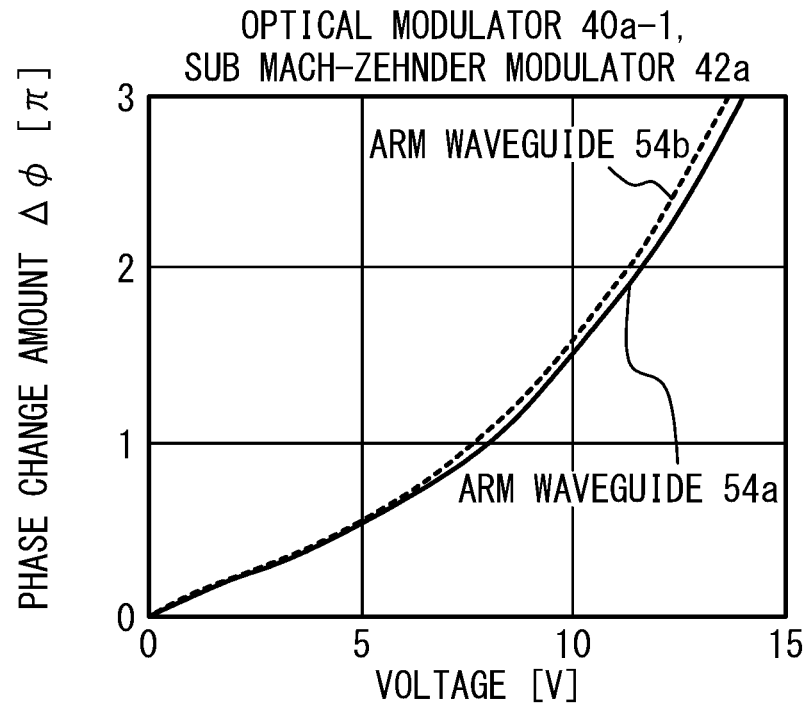
FIG. 12A is a diagram illustrating a phase change amount after optimization.
Figure 12B:
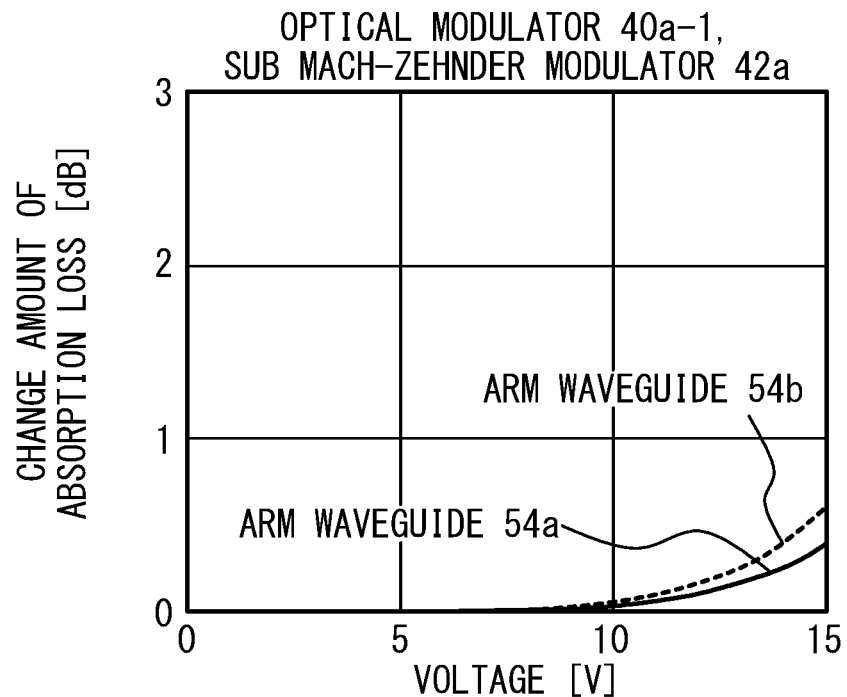
FIG. 12B is a diagram illustrating a change amount of absorption loss after optimization.

FIG. 12A is a diagram illustrating phase change amounts after the optimization. The horizontal axis, the vertical axis, the solid line, and the broken line are the same as corresponding ones in FIG. 4A. As illustrated in FIG. 12A, a phase change amount similar to that illustrated in FIG. 4A is obtained by substituting the coefficient obtained by optimization of transmittance into Equation 7. FIG. 12B is a diagram illustrating change amounts of absorption losses after optimization. The horizontal axis, the vertical axis, the solid line, and the broken line are the same as corresponding ones in FIG. 6A. As illustrated in FIG. 12B, the change amount of absorption loss similar to that in FIG. 6A can be obtained by substituting the coefficient obtained by optimization of transmittance into Equation 8.

Figure 13:
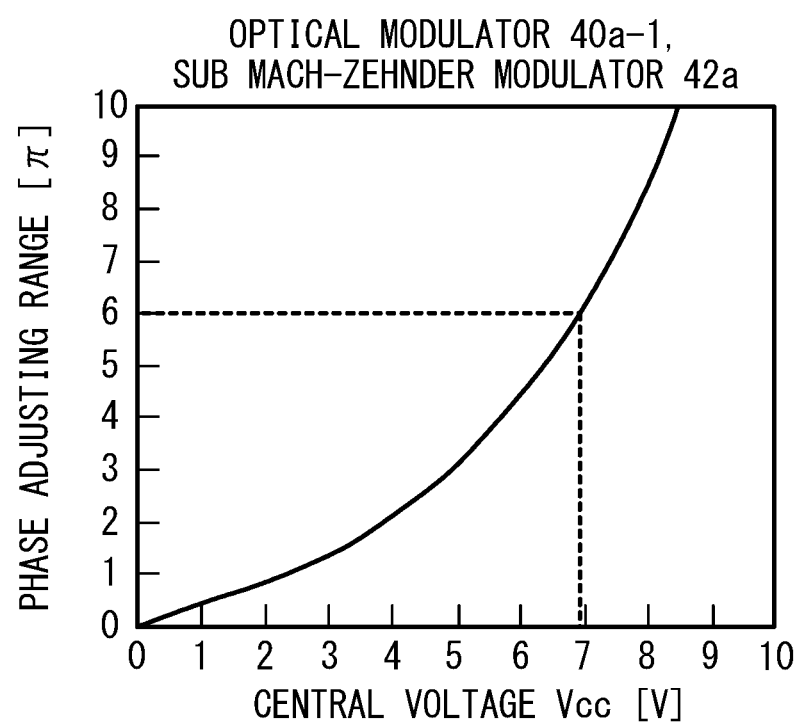
FIG. 13 is a diagram illustrating a relationship between a central voltage and a phase adjusting range.

FIG. 13 is a diagram illustrating a relationship between the central voltage and the phase adjusting range. The horizontal axis represents the central voltage Vcc, which in this example is swept from 0 V to 10 V. For each value of the central voltage Vcc, the differential voltage Vdc ranges from −Vcc to Vcc. The vertical axis represents the range of the phase change amount (phase adjusting range). Calculation unit 15 applies the coefficients k1 to k6 after optimization to Equation 7 to calculate the phase change amount of arm waveguide 54a and the phase change amount of arm waveguide 54b for each voltage. Calculation unit 15 calculates a difference between the phase change amount of arm waveguide 54a and the phase change amount of arm waveguide 54b to obtain the phase adjusting range in sub Mach-Zehnder modulator 42a. In sub Mach-Zehnder modulator 42a, the phase adjusting range may be 6π(from −3π to 3π). The minimum value of the central voltage Vcc is determined so that the phase adjusting range becomes 6n. As illustrated in FIG. 13, in order to set the phase adjusting range to 6π, the central voltage Vcc may be 7 V. Storage device 34 illustrated in FIG. 1B stores the central voltage Vc of sub Mach-Zehnder modulator 42a of optical modulator 40a-1 as 7 V.

Next, testing of sub Mach-Zehnder modulator 42b is performed (step S5 in FIG. 8). Phase control unit 12 of control unit 10 applies a voltage to phase adjusting electrode of sub Mach-Zehnder modulator 42a to adjust the operating point of sub Mach-Zehnder modulator 42a to the extinction point. Control unit 10 measures the light transmittance in arm waveguides 54c and 54d of sub Mach-Zehnder modulator 42b while sweeping the voltage applied from ABC circuit 24 to phase adjusting electrode of sub Mach-Zehnder modulator 42b (step S10 in FIG. 9). Calculation unit 15 of control unit 10 calculates the light transmittance in arm waveguide 54c and the light transmittance in arm waveguide 54d (step S12).

Calculation unit 15 performs optimization such that the transmittance calculated in step S12 approaches the transmittance measured in step S10 (step S14). Calculation unit 15 acquires the relationship between the voltage applied to the phase adjusting electrode and the phase change amount (step S16). Storage control unit 18, based on the relationship between the voltage and the phase change amount, acquires the voltage in which the range of the phase change amount of sub Mach-Zehnder modulator 42b has the predetermined magnitude, and stores the voltage in storage device 34 (step S18).

Figure 14:
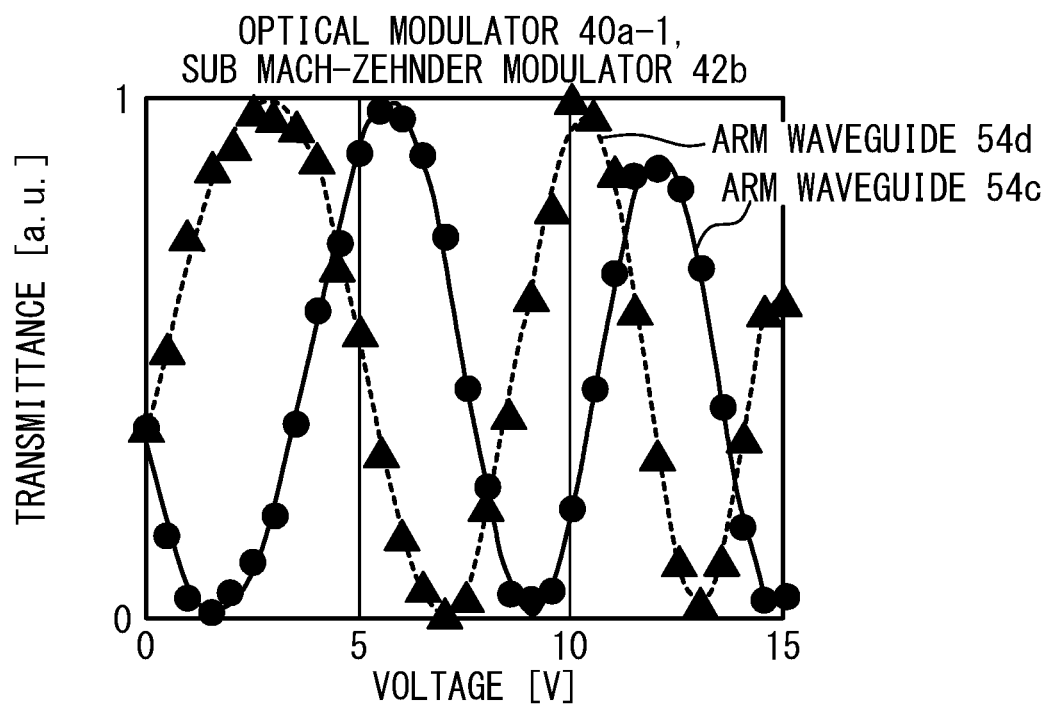
FIG. 14 is a diagram illustrating a measured transmittance and a transmittance after optimization.

FIG. 14 is a diagram illustrating measured transmittances and transmittances after optimization. The horizontal axis represents the voltage applied to phase adjusting electrodes 68d and 68e of sub Mach-Zehnder modulator 42b. The vertical axis represents light transmittance. The solid line represents the transmittance after optimization of the arm waveguide (arm waveguide 54c) on the p-side. The dotted line represents the transmittance after optimization of the arm waveguide (arm waveguide 54d) on the n-side. The circles represent the measurement result of the transmittance of arm waveguide 54c. The triangles represent the measurement result of the transmittance of arm waveguide 54d. By optimizing the transmittance, the phase change amount and the absorption loss change amount are obtained.

Figure 15A:
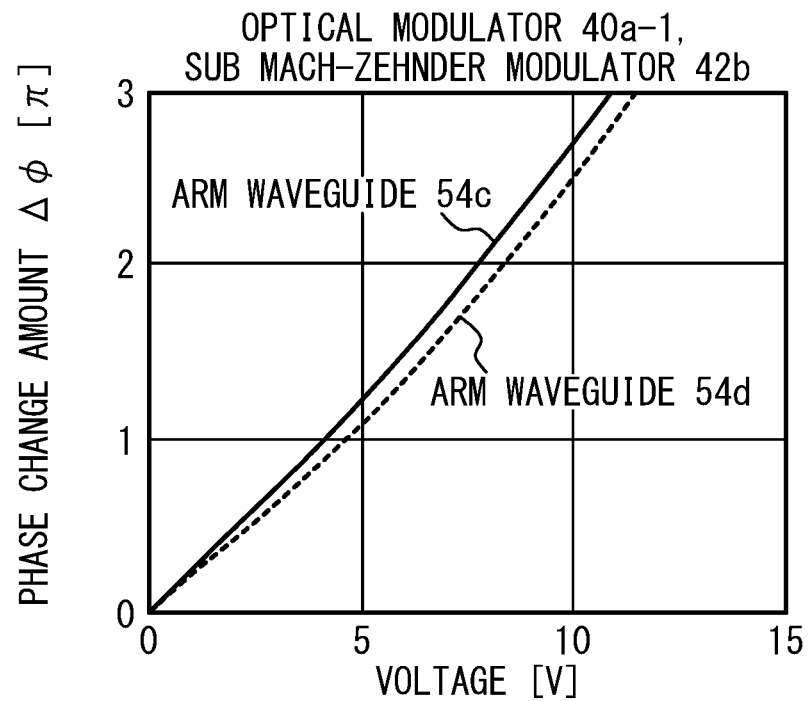
FIG. 15A is a diagram illustrating a phase change amount after optimization.
Figure 15B:
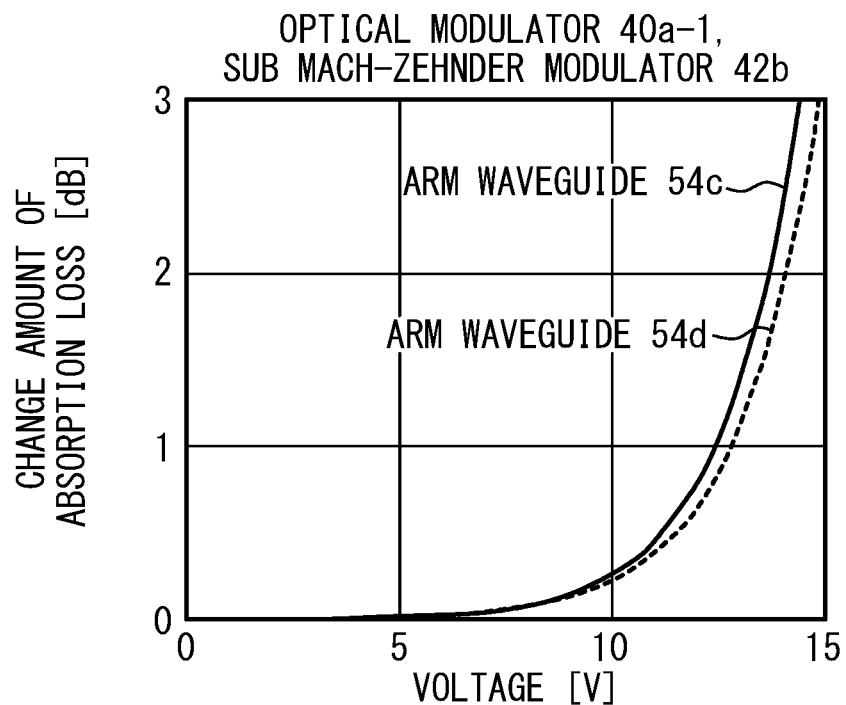
FIG. 15B is a diagram illustrating a change amount of absorption loss after optimization.

FIG. 15A is a diagram illustrating phase change amounts after optimization. The horizontal axis, the vertical axis, the solid line, and the dotted line are the same as the corresponding ones in FIG. 4B. As illustrated in FIG. 15A, a phase change amount similar to that illustrated in FIG. 4B is obtained by optimization. FIG. 15B is a diagram illustrating change amounts of absorption loss after optimization. The horizontal axis, the vertical axis, the solid line, and the dotted line are the same as the corresponding ones in FIG. 6B. As illustrated in FIG. 15B, the change amount of absorption loss similar to that in FIG. 6B is obtained by optimization.

Figure 16:
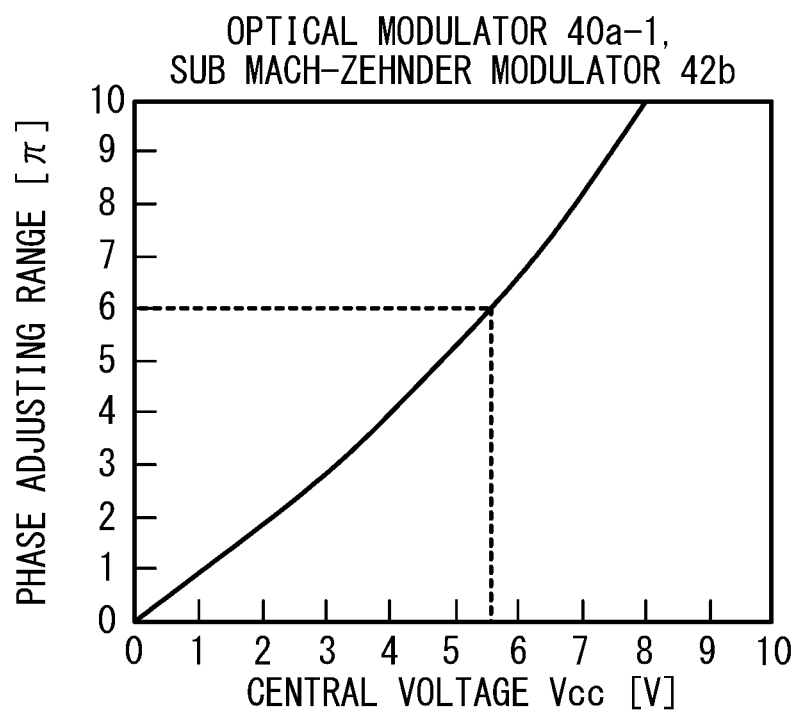
FIG. 16 is a diagram illustrating a relationship between a central voltage and a phase adjusting range.

FIG. 16 is a diagram illustrating the relationship between a central voltage and a phase adjusting range. The horizontal axis represents the central voltage Vcc. The vertical axis represents the range of the phase change amount (phase adjusting range). Calculation unit 15 applies the phase adjusting range for each voltage by applying the coefficients k1 to k6 after optimization to Equation 7. As illustrated in FIG. 16, in order to set the phase adjusting range to 6π in sub Mach-Zehnder modulator 42b, the central voltage Vcc may be 5.7 V. Storage device 34 stores the central voltage Vcc of sub Mach-Zehnder modulator 42b of optical modulator 40a-1 as 5.7 V.

Next, main Mach-Zehnder modulator 44a is tested (step S6 in FIG. 8). Phase control unit 12 of control unit 10 sets sub Mach-Zehnder modulators 42a and 42b to a maximum transmission point. Control unit 10 measures the light transmittance (first transmittance) in arm waveguide 55a of main Mach-Zehnder modulator 44a while sweeping the voltage applied from ABC circuit 24 to phase adjusting electrode 70a of main Mach-Zehnder modulator 44a. Control unit 10 measures the light transmittance (first transmittance) at arm waveguide 55b while sweeping the voltage applied to phase adjusting electrode 70b (step S10 in FIG. 9). Calculation unit 15 of control unit 10 calculates the light transmittance (second transmittance) in arm waveguide 55a and the light transmittance (second transmittance) in arm waveguide 55b (step S12).

Calculation unit 15 performs optimization such that the transmittance calculated in step S12 approaches the transmittance measured in step S10 (step S14). Calculation unit 15 acquires the relationship between the voltage applied to phase adjusting electrode 70a and the phase change amount in arm waveguide 55a (step S16). Based on the relationship between the voltage and the phase change amount, storage control unit 18 acquires a voltage in which the range of the phase change amount has a predetermined magnitude, and storage control unit 18 stores the voltage in storage device 34 (step S18).

The phase adjusting range in the 44a of main Mach-Zehnder modulator may be, for example, 5 π (from −2.5 π to 2.5 π. Storage device 34 stores 7 V as the central voltage Vcp in which the phase adjusting range of main Mach-Zehnder modulator 44a of optical modulator 40a-1 is 5π.

Next, optical modulator 40a-2 different from optical modulator 40a-1 is tested. The testing process of each Mach-Zehnder modulator is the same as the corresponding testing process of optical modulator 40a-1. It is assumed that 7 V is obtained as the central voltage of sub Mach-Zehnder modulator 42a of optical modulator 40a-2 in the same way as sub Mach-Zehnder modulator 42a of optical modulator 40a-1. It is assumed that 5.7 V is obtained as the central voltage of sub Mach-Zehnder modulator 42b of optical modulator 40a-2 in the same way as sub Mach-Zehnder modulator 42b of optical modulator 40a-1.

Figure 17:
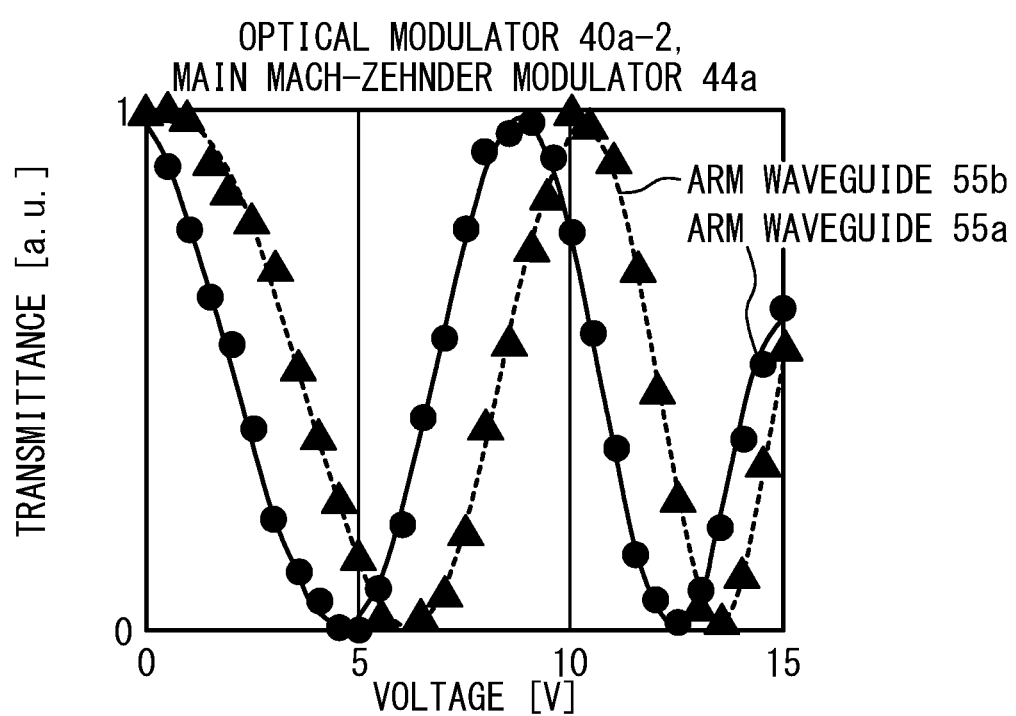
FIG. 17 is a diagram illustrating a measured transmittance and a transmittance after optimization.

Main Mach-Zehnder modulator 44a of optical modulator 40a-2 is also tested. FIG. 17 is a diagram illustrating measured transmittances and transmittances after optimization. The horizontal axis represents the voltage applied to phase adjusting electrodes 70a and 70b of main Mach-Zehnder modulator 44a. The vertical axis represents light transmittance. The solid line represents the transmittance after optimization of the arm waveguide (arm waveguide 55a) on the Ich side. The dotted line represents the transmittance after optimization of the arm waveguide (arm waveguide 55b) on the Qch side. The circles represent the measurement result of the transmittance of arm waveguide 55a. The triangles represent the measurement result of the transmittance of arm waveguide 55b. Optimization of transmittance changes the coefficients in Equation 7 and the coefficients in Equation 8.

Figure 18A:
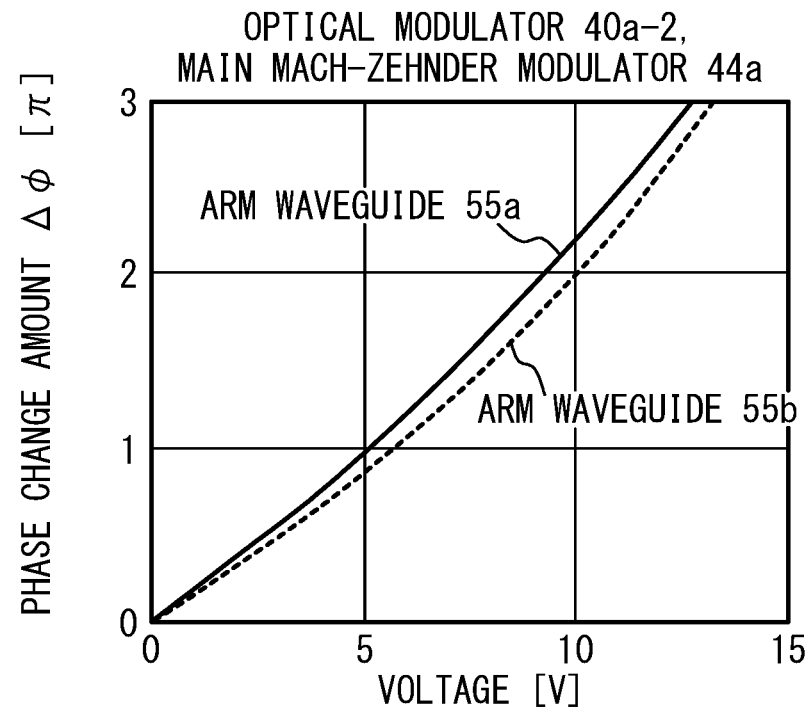
FIG. 18A is a diagram illustrating a phase change amount after optimization.
Figure 18B:
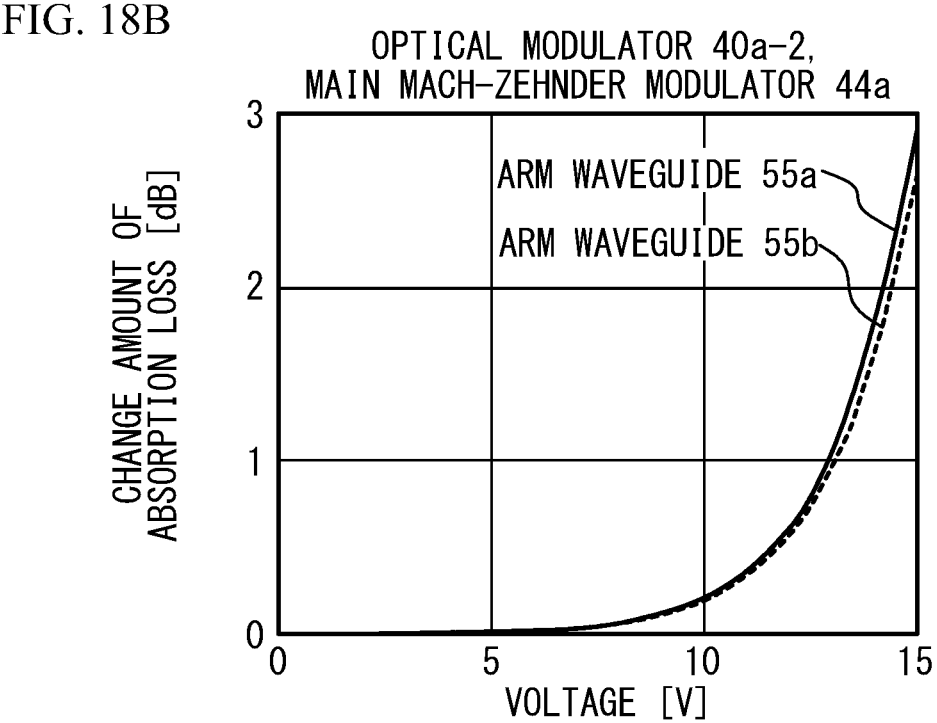
FIG. 18B is a diagram illustrating a change amount of absorption loss after optimization.

FIG. 18A is a diagram illustrating phase change amounts after optimization. The horizontal axis represents the voltage applied to phase adjusting electrodes 70a and 70b. The vertical axis represents the phase change amount. The solid line represents the phase change amount in arm waveguide 55a. The dashed line represents the phase change amount in arm waveguide 55b. FIG. 18B is a diagram illustrating change amounts of absorption loss after optimization. The horizontal axis represents the voltage applied to phase adjusting electrodes 70a and 70b. The vertical axis represents the change amount of absorption loss. The solid line represents the change amount in arm waveguide 55a. The dashed line represents the change amount in arm waveguide 55b.

Figure 19:
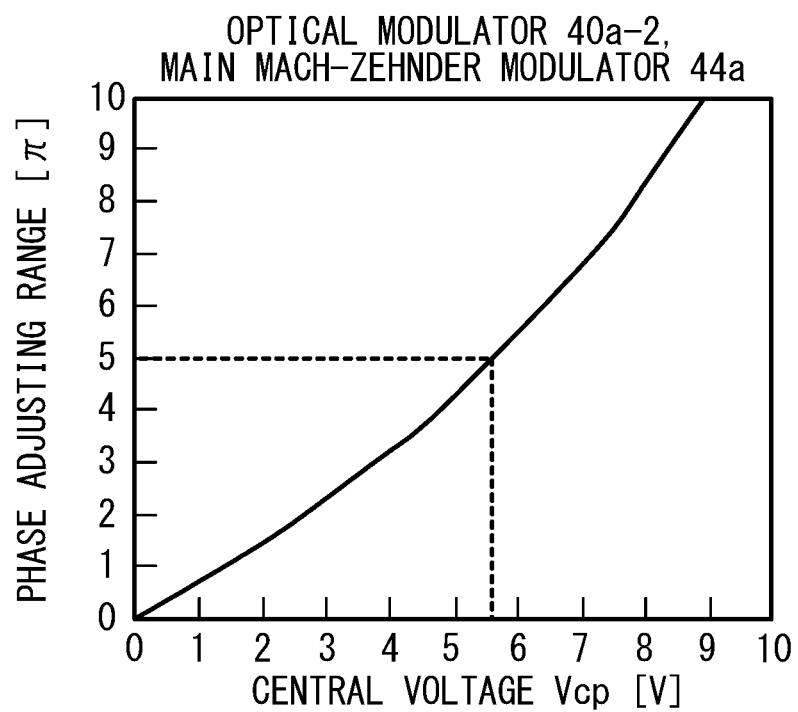
FIG. 19 is a diagram illustrating a relationship between a central voltage and a phase adjusting range.

FIG. 19 is a diagram illustrating a relationship between a central voltage and a phase adjusting range. The horizontal axis represents the central voltage Vcp. The vertical axis represents the range of the phase change amount (phase adjusting range). Calculation unit 15 acquires a phase adjusting range in main Mach-Zehnder modulator 44a for each voltage. As illustrated in FIG. 19, in main Mach-Zehnder modulator 44a of optical modulator 40a-2, the central voltage Vcp may be 5.7 V in order to set the phase adjusting range to 5π. Storage device 34 stores the central voltage Vc of main Mach-Zehnder modulator 44a of optical modulator 40a-2 as 5.7 V.

Table 1 is an example of a data table stored in storage device 34.

TABLE 1

|  | MODULATOR 40a-1 | MODULATOR 40a-2 |
|---|---|---|
| Vcc OF Ich [V] | 7.0 | 7.0 |
| Vcc OF Qch [V] | 5.7 | 5.7 |

TABLE 1-continued

|  | MODULATOR 40a-1 | MODULATOR 40a-2 |
|---|---|---|
| Vcp [V] | 7.4 | 5.7 |

Vcc of Ich illustrated in Table 1 is a central voltage of sub Mach-Zehnder modulator 42a. Vcc of Qch is the central voltage of sub Mach-Zehnder modulator 42b. Vcp is the central voltage of main Mach-Zehnder modulator 44a. In optical modulators 40a-1 and 40a-2, Vcc of Ich is 7.0 V, and Vcc of Qch is 5.7 V. Vcp in optical modulator 40a-1 is 7.4 V. Vcp in optical modulator 40a-2 is 5.7 V.

Storage device 34 stores the central voltage Vcc of sub Mach-Zehnder modulator 42a, the central voltage Vcc of sub Mach-Zehnder modulator 42b, and the central voltage Vcp of main Mach-Zehnder modulator 44a for each of optical modulators 40a-1 and 40a-2. The differential voltage Vcd of sub Mach-Zehnder modulator is to −Vcc or more and +Vcc or less. The differential voltage Vdp of main Mach-Zehnder modulator is set to −Vcp or more and +Vcp or less. The testing of FIG. 9 optimizes the voltages. When optical modulators 40a-1 and 40a-2 are used, by applying the voltages, the phase adjusting range can be set to a predetermined magnitude and an increase in light absorption loss can be suppressed.

(Absorption Loss Amount and Extinction Ratio of Sub Mach-Zehnder Modulator)

The absorption loss amount and the extinction ratio of sub Mach-Zehnder modulator will be described with reference to FIG. 20A to FIG. 22B. FIG. 20A to FIG. 21B are examples in which the testing illustrated in FIG. 9 is performed and the voltage is optimized as illustrated in Table 1, and correspond to the first embodiment. FIG. 22A and FIG. 22B illustrate an example in which the same voltage is applied to a plurality of sub Mach-Zehnder modulators without optimizing each of the voltages.

Figure 20A:
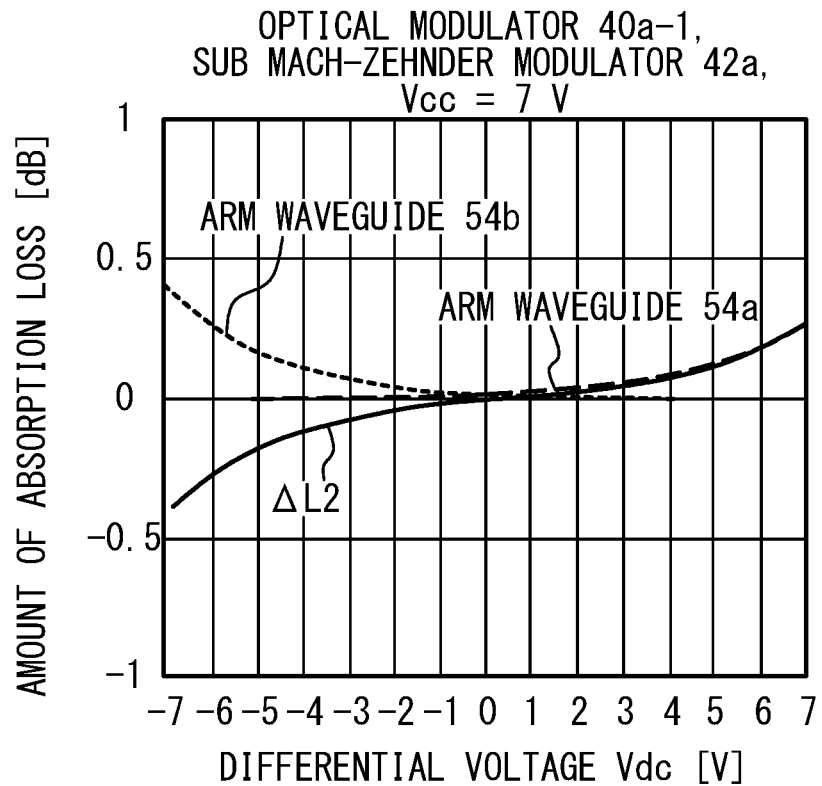
FIG. 20A is a diagram illustrating an amount of absorption loss.
Figure 21A:
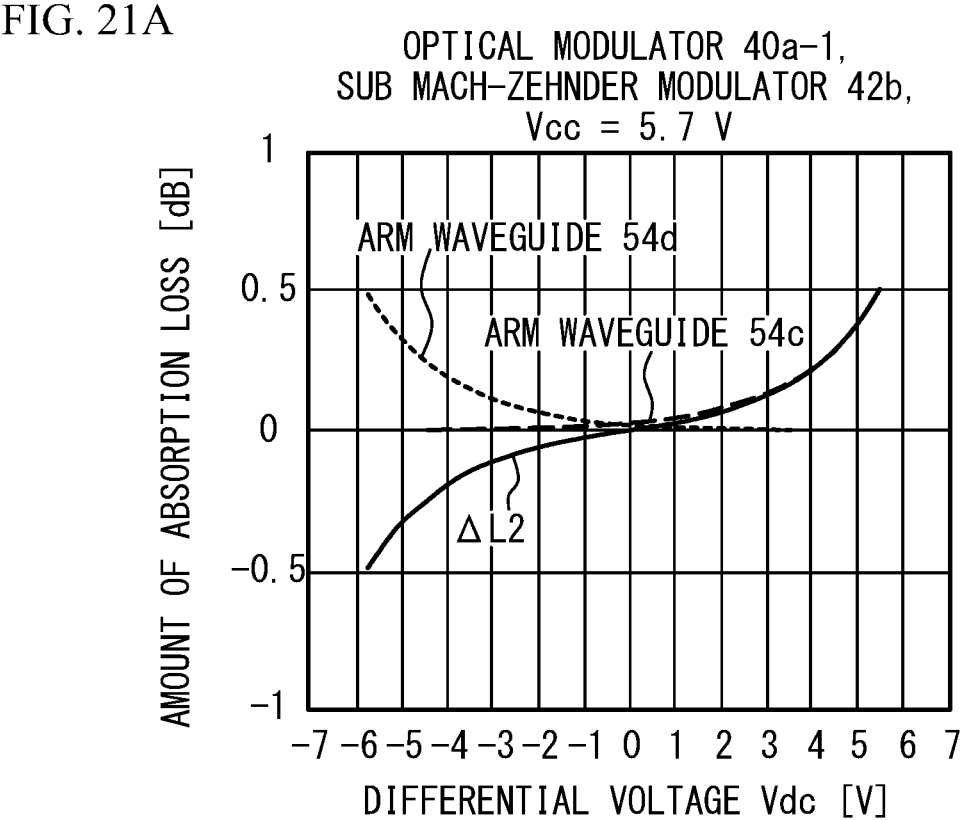
FIG. 21A is a diagram illustrating an amount of absorption loss.
Figure 22A:
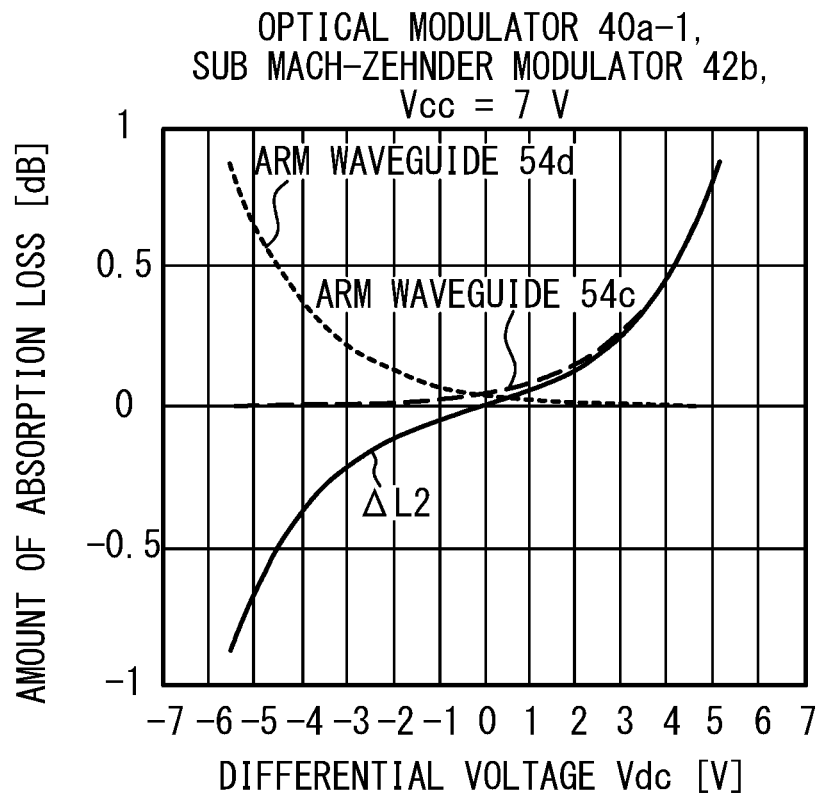
FIG. 22A is a diagram illustrating an amount of absorption loss.
Figure 22B:
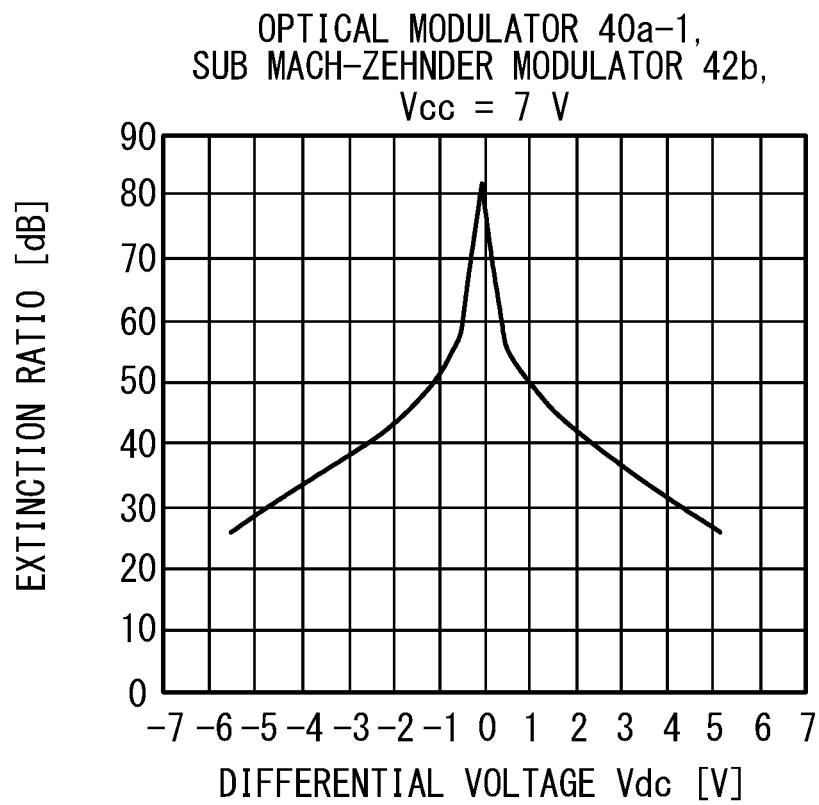
FIG. 22B is a diagram illustrating an extinction ratio.

FIG. 20A, FIG. 21A and FIG. 22A are diagrams illustrating change amounts of absorption loss. The horizontal axes represent the differential voltages Vdc. The vertical axes represent the amounts of light absorption loss. The broken line represents the amount of absorption loss in the arm waveguide (arm waveguide 54a or 54c) on the p-side. The dotted line represents the amount of absorption loss in the n-side arm waveguide (arm waveguide 54b or 54d). The solid line represents the difference ΔL2 between the absorption loss amounts of arm waveguides (the absorption loss amount of the p-side arm waveguide—the absorption loss amount of the n-side arm waveguide).

Figure 20B:
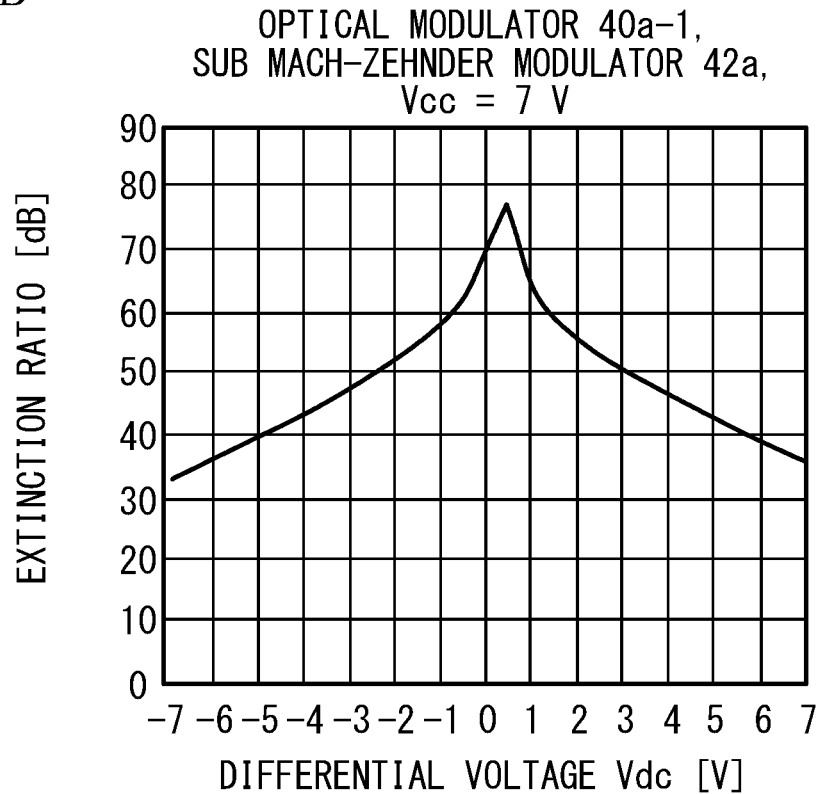
FIG. 20B is a diagram illustrating an extinction ratio.
Figure 21B:
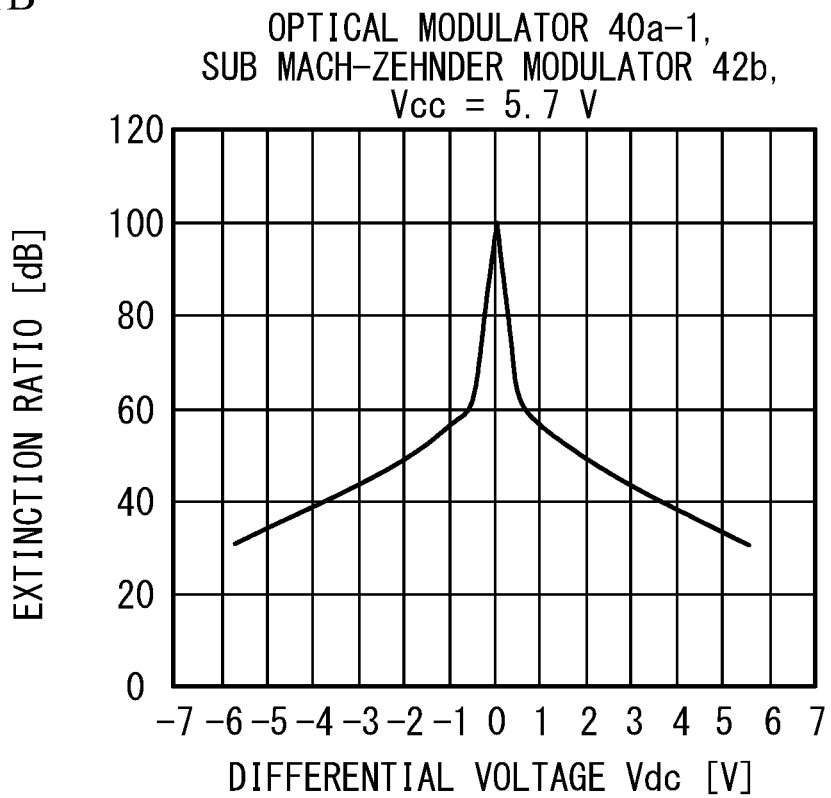
FIG. 21B is a diagram illustrating an extinction ratio.

FIG. 20B, FIG. 21B, and FIG. 22B are diagrams illustrating extinction ratios. The horizontal axes represent the differential voltage Vdc. The vertical axes represent the extinction ratio. The extinction ratio (ER) is calculated by the following equation.

$$ER = 20 \times \log_{10}((10^{(\Delta L2/20)} + 1)/(10^{(\Delta L2/20)} - 1)) \quad \text{[Equation 11]}$$

The extinction ratio ER increases as the difference ΔL2 between the absorption loss amounts decreases. The extinction ratio ER decreases as the difference ΔL2 increases. When the value of the difference ΔL2 becomes excessively large, the lights cannot be extinguished after the lights from the two arm waveguides are multiplexed with the opposite phase. As a result, the extinction ratio ER becomes small.

FIG. 20A illustrates the amount of absorption loss in sub Mach-Zehnder modulator 42a of optical modulator 40a-1 when the central voltage Vcc is 7 V. The differential voltage Vdc takes a value within a range from −6.8 V to 7 V. As the differential voltage Vdc increases to the negative side, the amount of absorption loss in arm waveguide 54b increases, and the amount of absorption loss in arm waveguide 54a approaches 0. The difference ΔL2 between the absorption loss amounts increases on the negative side. As the differential voltage Vdc increases to the positive side, the amount of absorption loss in arm waveguide 54a increases, and the amount of absorption loss in arm waveguide 54b approaches 0. The difference ΔL2 in the amount of absorption loss on the positive side. The maximum value of the absolute values of the absorption loss amount difference ΔL2 is 0.38 dB.

FIG. 20B illustrates the extinction ratio of sub Mach-Zehnder modulator 42a of optical modulator 40a-1. The extinction ratio ER in FIG. 20B is calculated from the difference ΔL2 in FIG. 20A. As the differential voltage Vdc increases to the positive side and the negative side, the extinction ratio ER decreases. The minimum value of the extinction ratio ER is 33.3 dB.

FIG. 21A illustrates the amount of absorption loss in sub Mach-Zehnder modulator 42b of optical modulator 40a-1 when the central voltage Vcc is 5.7 V. The differential voltage Vdc takes a value within a range from −5.8 V to 5.5 V. The maximum value of the absolute values of the absorption loss amount difference ΔL2 is 0.50 dB.

FIG. 21B illustrates the extinction ratio in sub Mach-Zehnder modulator 42b of optical modulator 40a-1. The extinction ratio ER in FIG. 21B is calculated from the difference ΔL2 in FIG. 21A. The minimum extinction ratio ER is 30.8 dB.

FIG. 22A illustrates the amount of absorption loss in sub Mach-Zehnder modulator 42b of optical modulator 40a-1 when the central voltage Vcc is 7 V. The maximum value of the absolute values of the absorption loss amount difference ΔL2 is 0.88 dB.

FIG. 22B illustrates the extinction ratio in sub Mach-Zehnder modulator 42b of optical modulator 40a-1. The extinction ratio ER in FIG. 22B is calculated from the difference ΔL2 in FIG. 22A. The minimum value of the extinction ratio ER is 26.0 dB.

As illustrated in FIG. 22A and FIG. 22B, when the central voltage of sub Mach-Zehnder modulator 42b is made equal to the central voltage of sub Mach-Zehnder modulator 42a, the amount of absorption loss increases and the extinction ratio decreases.

As illustrated in FIG. 21A and FIG. 21B, according to the first embodiment, by optimizing the central voltage of sub Mach-Zehnder modulator 42b, it is possible to reduce the amount of light absorption loss and suppress a decrease in extinction ratio. Thus, the extinction ratios of 30 dB or more can be achieved for both of sub Mach-Zehnder modulators 42a and 42b.

(Absorption Loss Amount and Extinction Ratio of Main Mach-Zehnder Modulator)

The absorption loss amount and extinction ratio of the main Mach-Zehnder modulator will be described with reference to FIG. 23A to FIG. 25B. Each of FIG. 23A to FIG. 24B illustrates an example in which the testing illustrated in FIG. 9 is performed and the voltage is optimized as illustrated in Table 1. Each of FIG. 25A and FIG. 25B illustrates an example in which the same voltage is applied to a plurality of main Mach-Zehnder modulators without optimizing the voltage.

Figure 23A:
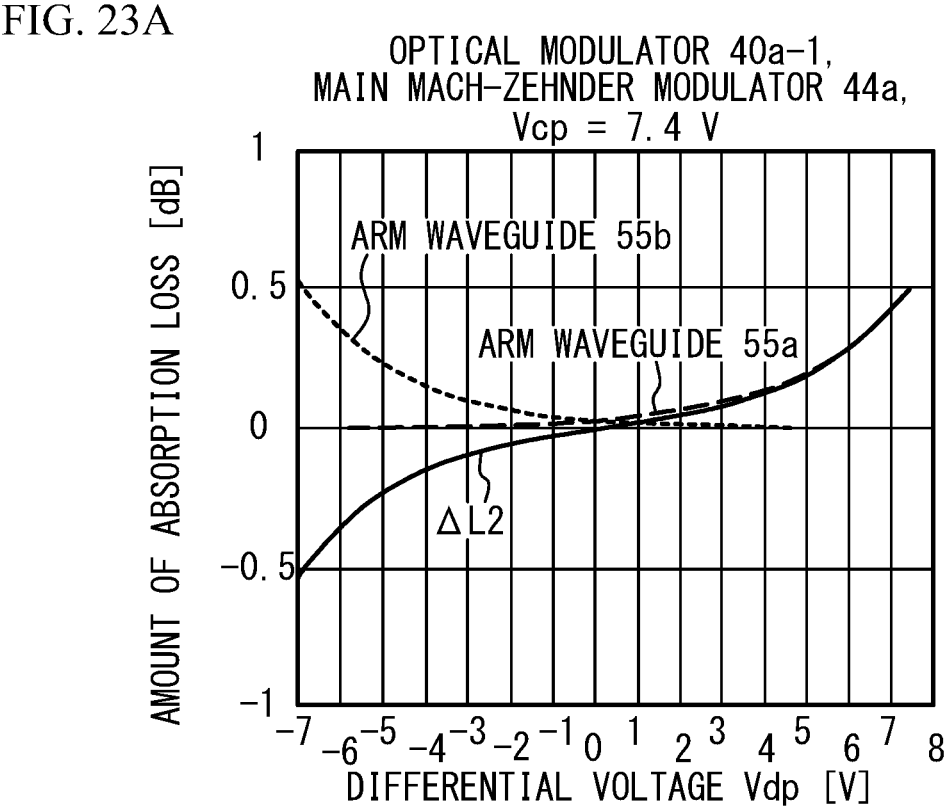
FIG. 23A is a diagram illustrating an amount of absorption loss.
Figure 23B:
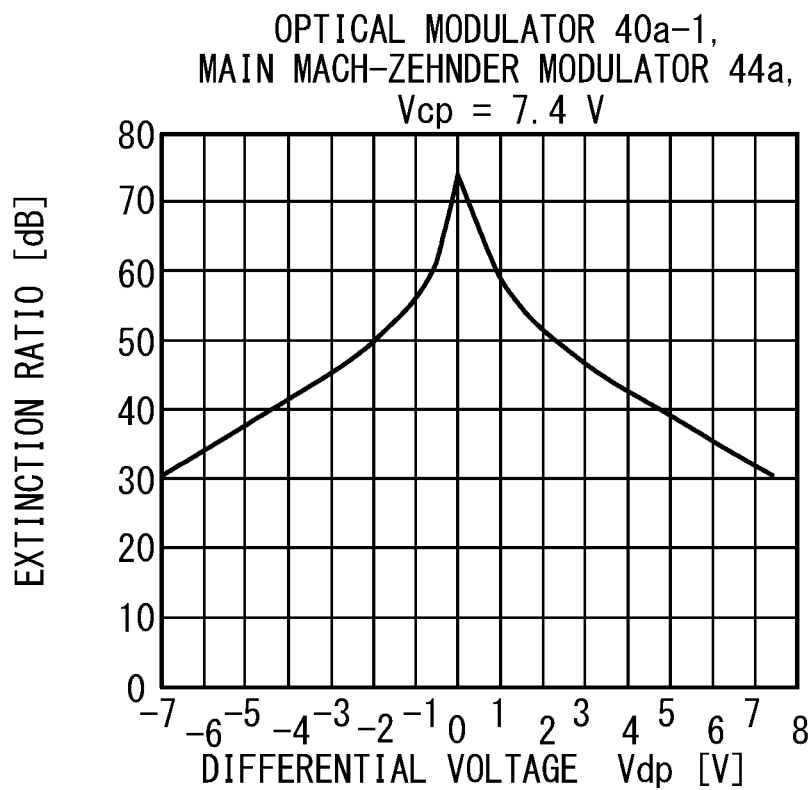
FIG. 23B is a diagram illustrating an extinction ratio.
Figure 24A:
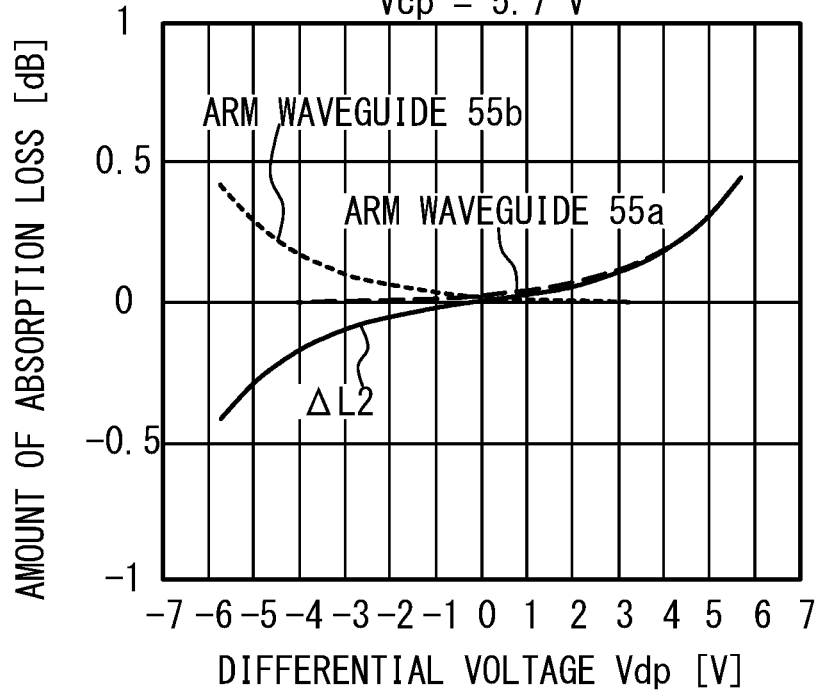
FIG. 24A is a diagram illustrating an amount of absorption loss.
Figure 24B:
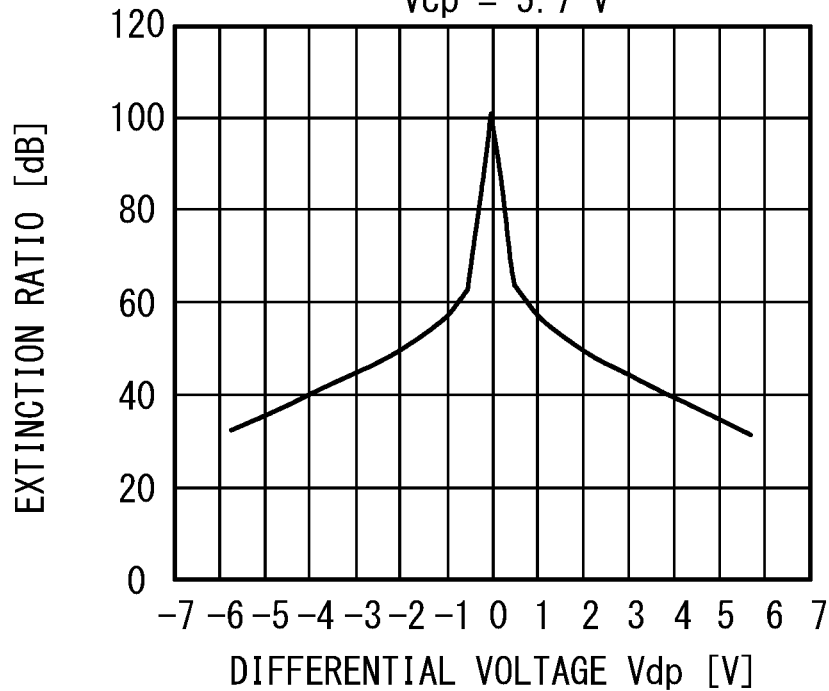
FIG. 24B is a diagram illustrating an extinction ratio.
Figure 25A:
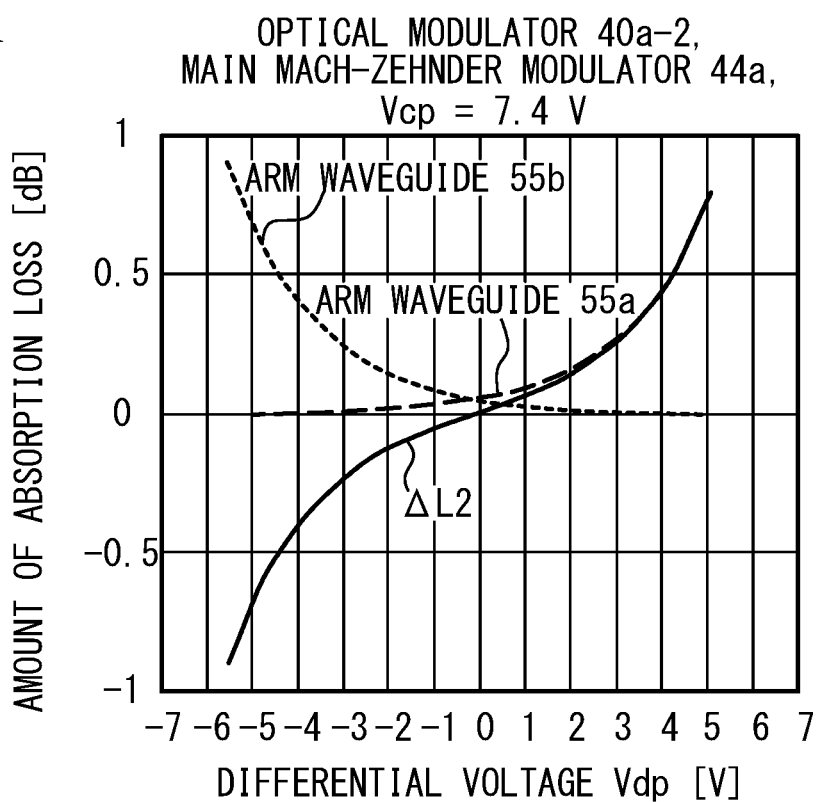
FIG. 25A is a diagram illustrating an amount of absorption loss.
Figure 25B:
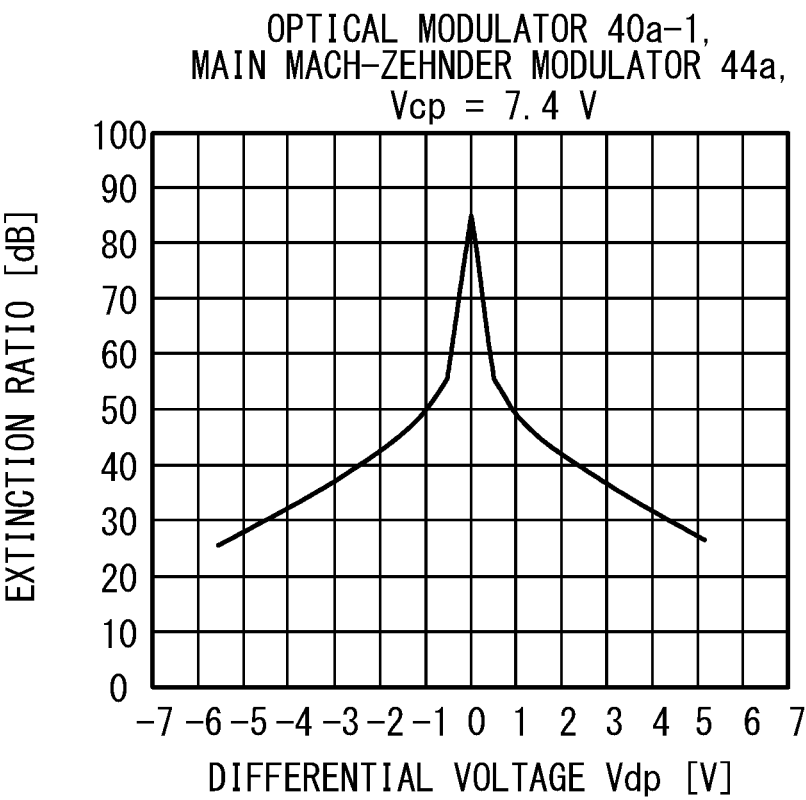
FIG. 25B is a diagram illustrating an extinction ratio.

FIG. 23A, FIG. 24A, and FIG. 25A are diagrams illustrating amounts of absorption losses. The horizontal axes represent the differential voltage Vdp. The vertical axes represent the amount of light absorption loss. The broken line represents the amount of absorption loss of the arm waveguide (arm waveguide 55a) on the Ich side. The dotted line represents the amount of absorption loss of the arm waveguide (arm waveguide 55b) on the Qch side. The solid line represents the difference ΔL2 between the absorption loss amounts of arm waveguides (the absorption loss amount of the arm waveguide for Ich minus the absorption loss amount of the arm waveguide for Qch). FIG. 23B, FIG. 24B, and FIG. 25B are diagrams illustrating extinction ratios. The horizontal axes represent the differential voltage Vdp. The vertical axes represent the extinction ratio.

FIG. 23A illustrates the amount of absorption loss in main Mach-Zehnder modulator 44a of optical modulator 40a-1 when the central voltage Vcp is 7.4 V. The differential voltage Vdp takes a value within a range of −7 V or more and 7.4 V or less. The maximum value of the absolute values of the absorption loss amount difference ΔL2 is 0.53 dB.

FIG. 23B illustrates the extinction ratio in main Mach-Zehnder modulator 44a of optical modulator 40a-1. The extinction ratio ER in FIG. 23B is calculated from the difference ΔL2 in FIG. 23A. The minimum extinction ratio ER is 30.3 dB.

FIG. 24A illustrates the amount of absorption loss in main Mach-Zehnder modulator 44a of optical modulator 40a-2 when the central voltage Vcp is 5.7 V. The maximum value of the absolute values of the absorption loss amount difference ΔL2 is 0.44 dB.

FIG. 24B illustrates the extinction ratio in main Mach-Zehnder modulator 44a of optical modulator 40a-2. The extinction ratio ER in FIG. 24B is calculated from the difference ΔL2 in FIG. 24A. The minimum value of the extinction ratio ER is 31.9 dB.

FIG. 25A illustrates the amount of absorption loss in main Mach-Zehnder modulator 44a of optical modulator 40a-2 when the central voltage Vcp is 7.4 V. The differential voltage Vdp takes a value within a range of −5.5 V or more and 5.1 V or less. The maximum value of the absolute values of the absorption loss amount difference ΔL2 is 0.89 dB.

FIG. 25B illustrates the extinction ratio in main Mach-Zehnder modulator 44a of optical modulator 40a-2. The extinction ratio ER in FIG. 25B is calculated from the difference ΔL2 in FIG. 25A. The minimum value of the extinction ratio ER is 25.8 dB.

As illustrated in FIG. 25A and FIG. 25B, when the central voltage of main Mach-Zehnder modulator 44a of optical modulator 40a-2 is made equal to the central voltage of main Mach-Zehnder modulator 44a of optical modulator 40a-1, the amount of absorption loss increases and the extinction ratio decreases.

As illustrated in FIG. 24A and FIG. 24B, according to the first embodiment, by optimizing the central voltage of main Mach-Zehnder modulator 44a of optical modulator 40a-2, it is possible to reduce the amount of light absorption loss and suppress a decrease in extinction ratio. In main Mach-Zehnder modulator 44a of both optical modulators 40a-1 and 44a-2, an extinction ratio of 30 dB or more can be obtained.

According to the first embodiment, control unit 10 acquires the relationship between the voltage applied to phase adjusting electrode and the phase change amount, and acquires the voltage in which the phase adjusting range has a predetermined magnitude. The phase of light in a Mach-Zehnder modulator is adjusted with a voltage optimized for each Mach-Zehnder modulator. It is possible to set a phase adjusting range to a predetermined magnitude and to suppress an increase in absorption loss of light.

The voltage is optimized for each of a plurality of Mach-Zehnder modulators in one optical modulator, such as sub Mach-Zehnder modulators 42a and 42b in optical modulator 40a-1. In each Mach-Zehnder modulator, the phase adjusting range can be set to a predetermined magnitude, and an increase in light absorption loss can be suppressed. For example, the central voltage Vcc of sub Mach-Zehnder modulator 42a is set to 7 V, and the central voltage Vcc of sub Mach-Zehnder modulator 42b is set to 5.7 V. As illustrated in FIG. 13 and FIG. 16, in both sub Mach-Zehnder modulators 42a and 42b, the phase adjusting range can be 6π. As illustrated in FIG. 20A to FIG. 21B, by suppressing the increase in absorption loss, the extinction ratio can be 30 dB or more.

A voltage is optimized in a plurality of optical modulators such as optical modulator 40a-1 and optical modulator 40a-2. The central voltage Vcp of main Mach-Zehnder modulator 44a of optical modulator 40a-1 is set to 7 V, and the central voltage Vcp of main Mach-Zehnder modulator 44a of optical modulator 40a-2 is set to 5.7 V. In the two main Mach-Zehnder modulators 44a, the phase adjusting range can be 5π. As illustrated in FIG. 23A to FIG. 24B, by suppressing the increase in absorption loss, the extinction ratio can be 30 dB or more.

The phase adjusting range in the sub Mach-Zehnder modulator is, for example, a range of 6π from −3π to 3π, but may be 6π or more or 6π or less. The phase adjusting range in the main Mach-Zehnder modulator is, for example, 5π from −2.5π to 2.5π, but may be 5π or more or 5π or less. The phase adjusting range may have a suitable magnitude according to, for example, the initial phase shift φ0. The phase adjusting range of sub Mach-Zehnder modulator may be, for example, 5π or 7π. The phase adjusting range of main Mach-Zehnder modulator may be, for example, 4π or 6π.

Sub Mach-Zehnder modulator 42a has two paired arm waveguides 52a and 52b. Phase adjusting electrode 68a is provided on arm waveguide 52a. Phase adjusting electrode 68b is provided on arm waveguide 52b. Control unit 10 acquires the relationship between the voltage applied to phase adjusting electrode 68a and the phase change amount in arm waveguide 52a and the relationship between the voltage applied to phase adjusting electrode 68b and the phase change amount in arm waveguide 52b (FIG. 12A). Based on the relationship between the voltage and the phase change amount as illustrated in FIG. 13, control unit 10 can acquire a voltage in which the phase adjusting range in sub Mach-Zehnder modulator 42a to be 6π. Control unit 10 acquires, each for sub Mach-Zehnder modulator 42b and for main Mach-Zehnder modulator 44a, the relationship between the voltage applied to the phase adjusting electrode and the phase change amount in the arm waveguide, and acquires the voltage in which the phase adjusting range has a desired magnitude based on the relationship.

The Mach-Zehnder modulator is differentially driven. The voltage Vp applied to the sub Mach-Zehnder modulator is Vcc+Vdc, and the voltage Vn is Vcc-Vdc. The voltage VI applied to the main Mach-Zehnder modulator is Vcp+Vdp, and the voltage VQ is Vcp-Vdp. In step S18 of FIG. 9, control unit 10 acquires the central voltages Vcc and Vcp. As illustrated in FIG. 13, FIG. 16, and FIG. 19, by acquiring the optimal central voltage, the phase adjusting range becomes the predetermined magnitude. As illustrated in Table 1, storage device 34 stores the optimum central voltages Vcc and Vcp for each Mach-Zehnder modulator. When driving the Mach-Zehnder modulator, control unit 10 acquires the central voltage stored in storage device 34 and calculates the sum and difference of the central voltage and the differential voltage to acquire the voltages Vp, Vn, VI, and VQ. ABC circuit 24 applies the voltage to the phase adjusting electrode. In each Mach-Zehnder modulator, the predetermined phase adjusting range can be obtained, and the increase in absorption loss can be suppressed. In the first embodiment, the central voltage in the differential drive is optimized. The Mach-Zehnder modulator may be driven by a method other than the differential driving. Regardless of a driving method, the phase adjusting range of a Mach-Zehnder modulator can be controlled with the optimum voltage, and the increase in absorption loss can be suppressed.

The differential voltage Vdc of the sub Mach-Zehnder modulator is set to a value between −Vcc or more and Vcc or less. The differential voltage Vdp of the main Mach-Zehnder modulator is set to a value between −Vcp or more and Vcp or less. The differential voltage may vary from that described above.

In step S12 of FIG. 9, the transmittance is calculated as a function of the phase change amount (Equation 9). The transmittance is fitted, and the calculated transmittance is brought close to the measured transmittance. By optimizing the transmittance, the phase change amount is also optimized. The phase change amount illustrated in Equation 7 is a function of voltage. By the fitting of the transmittance, the coefficients in Equation 7 change, and the relationship between the voltage and the phase change amount becomes more accurate. Control unit 10 acquires, based on the phase change amount, the voltage in which the phase adjusting range has the predetermined magnitude. It is possible to set the phase adjusting range to the predetermined magnitude and suppress the increase in absorption loss of light. The transmittance, the phase change amount, and the absorption loss change amount may be calculated from expressions other than the above-described expressions.

As illustrated in FIG. 2B, each of arm waveguides 54a and 54b has cladding layer 82, core layer 84, cladding layer 86 and contact layer 88. The other arm waveguides have the same configuration. Cladding layer 82 is an n-type semiconductor layer. Cladding layer 86 and contact layer 88 are p-type semiconductor layers. Dopants are added to obtain n-type and p-type conductivity types. The variation in the thermal diffusion amount of the dopant causes variation in the phase adjusting efficiency of the Mach-Zehnder modulator. According to the first embodiment, the voltage in which the phase adjusting rage has the predetermined magnitude is acquired for each Mach-Zehnder modulator. It is possible to set the phase adjusting range to the predetermined range and suppress the increase in absorption loss.

In the steps of FIG. 8 and FIG. 9, light transmission apparatus 100 of FIG. 1A is utilized as a testing apparatus for optical modulator 40. One optical modulator 40 (e.g. optical modulator 40a-1) is incorporated into light transmission apparatus 100 for testing. Then, optical modulator 40a-1 is replaced with optical modulator 40a-2 for testing. Storage device 34 stores the voltages for both optical modulators 40a-1 and 40a-2 as illustrated in Table 1. In case light transmission apparatus 100 is used for communication, one optical modulator 40a included in light transmission apparatus 100 may be tested. Storage device 34 may store only the voltage for the one optical modulator 40a.

Second Embodiment

In the second embodiment, a dual polarization (DP)-IQ modulator is used as optical modulator 40. The configuration of light transmission apparatus 100 is the same as that of the first embodiment.

Figure 26:
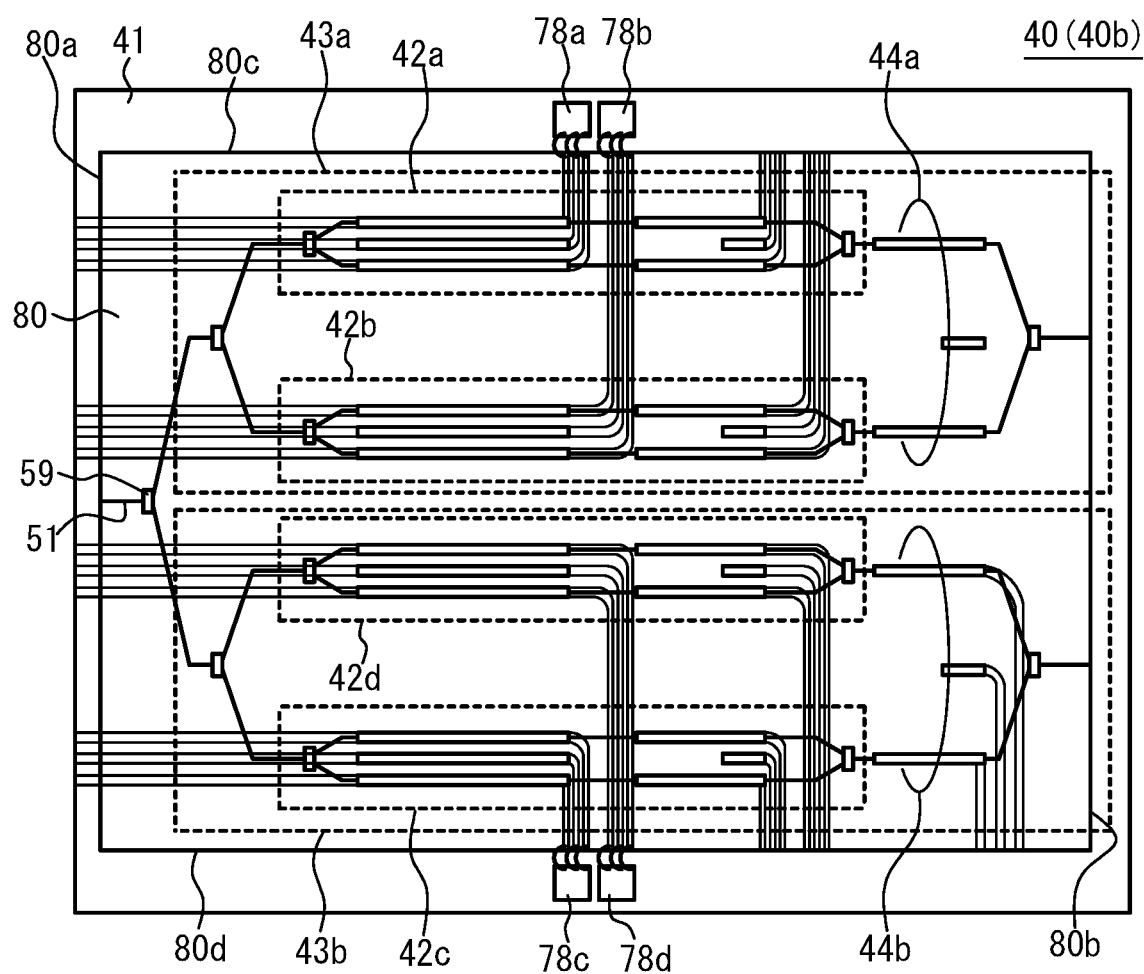
FIG. 26 is a plan view illustrating an optical modulator.

FIG. 26 is a plan view illustrating an optical modulator 40b. Optical modulator 40b is a DP-IQ modulator and has two optical modulators 43a and 43b.

Semiconductor substrate 80 and four termination elements 78a, 78b, 78c, and 78d are mounted on the upper surface of substrate 41. Termination elements 78a, 78b, 78c, and 78d include, for example, resistors and capacitors. Termination elements 78a and 78b face end surface 80c of semiconductor substrate 80. Termination elements 78c and 78d face end surface 80d of semiconductor substrate 80. An input waveguide 51, optical modulators 43a and 43b are formed on semiconductor substrate 80.

A first end portion of input waveguide 51 is located on end surface 80a of semiconductor substrate 80. A second end portion of input waveguide 51 is connected to a coupler 59. Two optical modulators 43a and 43b are arranged in parallel after coupler 59.

Optical modulator 43a is the IQ modulator, and has two sub Mach-Zehnder modulators 42a and 42b and main Mach-Zehnder modulator 44a, similar to optical modulator 40a of FIG. 2A. Optical modulator 43b is the IQ modulator, and has two sub Mach-Zehnder modulators 42c and 42d and main Mach-Zehnder modulator 44b. The configurations of sub Mach-Zehnder modulators 42c and 42d are the same as those of sub Mach-Zehnder modulators 42a and 42b. The configuration of main Mach-Zehnder modulator 44b is the same as that of main Mach-Zehnder modulator 44a.

Optical modulator 43a generates modulated light of an X channel (X polarization). Optical modulator 43b generates modulated light of a Y channel (Y polarization). The polarization plane of the X-polarized wave is orthogonal to the polarization plane of the Y-polarized wave. Two modulated lights are multiplexed so that the planes of polarization are orthogonal to each other by using a polarization rotation element and a multiplexing element (not illustrated).

The manufacturing method of optical modulator 40b is similar to that of FIG. 8. Control unit 10 performs the testing of FIG. 9 for each Mach-Zehnder modulator in optical modulator 40b. When testing sub Mach-Zehnder modulators 42a and 42b and main Mach-Zehnder modulator 44a in optical modulator 43a, the operating points of sub Mach-Zehnder modulators 42c and 42d of optical modulator 43b are adjusted to the extinction points. When testing sub Mach-Zehnder modulators 42c and 42d and main Mach-Zehnder modulator 44b of optical modulator 43b, the operating points of sub Mach-Zehnder modulators 42a and 42b of optical modulator 43a are adjusted to the extinction points.

Table 2 is an example of a data table stored in storage device 34. Storage device 34 stores the voltages of each of the plurality of optical modulators 40b (optical modulators 40b-1 and 40b-2 in Table 2).

TABLE 2

|  | MODULATOR 40b-1 | MODULATOR 40b-2 |
| --- | --- | --- |
| Vcc OF XI [V] | 5.8 | . |
| Vcc OF XQ [V] | 6.2 | . |
| Vcc OF YI [V] | 6.0 | . |
| Vcc OF YQ [V] | 6.1 | . |
| Vcp OF Xch [V] | 5.9 |  |
| Vcp OF Ych [V] | 6.0 |  |

Vcc of XI is the central voltage of sub Mach-Zehnder modulator 42a of optical modulator 43a on the Xch side of optical modulator 40b. Vcc of XQ is the central voltage of sub Mach-Zehnder modulator 42b of optical modulator 43a. Vcc of YI is the central voltage of sub Mach-Zehnder modulator 42c of optical modulator 43b on the Qch side of optical modulator 40b. Vcc of YQ is a central voltage of sub Mach-Zehnder modulator 42d of optical modulator 43b. Vcp of Xch is the central voltage of main Mach-Zehnder modulator 44a. Vcp of Ych is the central voltage of main Mach-Zehnder modulator 44b. The voltages in optical modulator 40b-1 are, for example, 5.8 V, 6.2 V, 6.0 V, 6.1 V, 5.9 V, and 6.0 V. Specific values of the voltages of optical modulator 40b-2 are omitted.

According to the second embodiment, by driving the Mach-Zehnder modulator with the voltages optimized for each Mach-Zehnder modulator, the phase adjusting range can be set to the predetermined magnitude and the increase in light absorption loss can be suppressed.

An example of optical modulator 40 is IQ modulator in the first embodiment, and DP-IQ modulator in the second embodiment. The present disclosure may be applied to other optical modulators.

Although the embodiments of the present disclosure have been described in detail above, the present disclosure is not limited to the specific embodiments, and various modifications and changes can be made within the scope of the gist of the present disclosure described in the claims.

What is claimed is:

1. A method for manufacturing an optical modulator, the optical modulator including a plurality of Mach-Zehnder modulators, each of the plurality of Mach-Zehnder modulators including an electrode and an arm waveguide, the electrode being disposed on the arm waveguide, the method comprising:
    a step of preparing the plurality of Mach-Zehnder modulators;
    measuring a first transmittance which is a light transmittance in the arm waveguide while adjusting an operating point;
    calculating a second transmittance which is a light transmittance in the arm waveguide;
    calculating an optimized voltage using the first transmittance and the second transmittance;
    a step of calculating for each of the plurality of Mach-Zehnder modulators, based on the optimized voltage, a relationship between a voltage applied to the electrode and a phase change amount of light propagating through the arm waveguide;
    a step of acquiring for each of the plurality of Mach-Zehnder modulators, based on the relationship, a second voltage in which a range of a phase change amount of light in each of the plurality of Mach-Zehnder modulators has a predetermined range; and
    a step of storing the second voltage in a storage unit.

2. The method for manufacturing an optical modulator according to claim 1, wherein
    the plurality of Mach-Zehnder modulators includes a main Mach-Zehnder modulator and a sub Mach-Zehnder modulator,
    the step of preparing the plurality of Mach-Zehnder modulators includes a step of preparing the main Mach-Zehnder modulator and a step of preparing the sub Mach-Zehnder modulator, and
    the step of calculating the relationship between the voltage and the phase change amount and the step of acquiring the second voltage are performed on each of the main Mach-Zehnder modulator and the sub Mach-Zehnder modulator.

3. The method for manufacturing an optical modulator according to claim 1, wherein
the step of preparing each of the plurality of Mach-Zehnder modulators includes a step of preparing each of the plurality of Mach-Zehnder modulators including a first arm waveguide, a second arm waveguide, a first electrode, and a second electrode,
the first electrode is disposed on the first arm waveguide,
the second electrode is disposed on the second arm waveguide,
the step of calculating the relationship between the voltage and the phase change amount includes a step of calculating a relationship between a voltage applied to the first electrode and a phase change amount of light propagating through the first arm waveguide and a step of calculating a relationship between a voltage applied to the second electrode and a phase change amount of light propagating through the second arm waveguide,
the range of the phase change amount of the light in each of the plurality of Mach-Zehnder modulators is a range of a difference between the phase change amount of the light propagating through the first arm waveguide and the phase change amount of the light propagating through the second arm waveguide, and
the step of acquiring the second voltage is a step of acquiring a voltage applied to the first electrode and a voltage applied to the second electrode, in which the range of the phase change amount of the light in each of the plurality of Mach-Zehnder modulators has the predetermined range.

4. The method for manufacturing an optical modulator according to claim 3, wherein
the voltage applied to the first electrode is a sum of a first voltage and a third voltage,
the voltage applied to the second electrode is a difference between the first voltage and the third voltage, and
the step of acquiring the second voltage is a step of acquiring the first voltage in which the range of the phase change amount of the light in each of the plurality of Mach-Zehnder modulators has the predetermined range.

5. The method for manufacturing an optical modulator according to claim 1, wherein
in the step of calculating the second transmittance, the second transmittance is represented by a function of the phase change amount of the light propagating through the arm waveguide, the phase change amount of the light propagating through the arm waveguide is represented by a function of the voltage applied to the electrode, and thus the second transmittance is calculated, and
in the step of calculating the relationship between the voltage and the phase change amount, the second transmittance is adjusted such that the second transmittance approaches the first transmittance, and thus the relationship between the voltage and the phase change amount is acquired.

6. The method for manufacturing an optical modulator according to claim 1, wherein
the step of preparing each of the plurality of Mach-Zehnder modulators includes a step of forming each of the plurality of Mach-Zehnder modulators,
the step of forming each of the plurality of Mach-Zehnder modulators includes a step of forming the arm waveguide including a first semiconductor layer, a core layer, and a second semiconductor layer,
the first semiconductor layer, the core layer, and the second semiconductor layer are stacked in order,
the first semiconductor layer has a first conductivity type, and
the second semiconductor layer has a second conductivity type.

7. The method for manufacturing an optical modulator according to claim 1, the method further comprising:
adjusting the operating point of each of the plurality of Mach-Zehnder modulators by applying a first voltage to the electrode, such that the operating point is adjusted to an extinction point; and
measuring the first transmittance while sweeping the first voltage to the electrode, wherein
calculating the optimized voltage is performed using the first transmittance and the second transmittance,
the step of calculating the relationship is performed using on the optimized voltage to determine a second relationship between the first voltage and the phase change amount of light propagating through the arm waveguide, and
the step of acquiring the second voltage is determined using the second relationship.

8. A method for testing an optical modulator, the optical modulator including a plurality of Mach-Zehnder modulators that each includes an electrode and an arm waveguide, and the electrode is disposed on the arm waveguide, the method comprising:
a step of preparing the plurality of Mach-Zehnder modulators;
measuring a first transmittance which is a light transmittance in the arm waveguide while adjusting an operating point;
calculating a second transmittance which is a light transmittance in the arm waveguide;
calculating an optimized voltage using the first transmittance and the second transmittance;
a step of calculating for each of the plurality of Mach-Zehnder modulators, based on the optimized voltage, a relationship between a voltage applied to the electrode and a phase change amount of light propagating through the arm waveguide;
a step of acquiring for each of the plurality of Mach-Zehnder modulators, based on the relationship, a second voltage in which a range of a phase change amount of light in each of the plurality of Mach-Zehnder modulators has a predetermined range; and
store the second voltage in a storage unit.

9. A non-transitory computer-readable storage medium storing a program for testing an optical modulator, the optical modulator including a plurality of Mach-Zehnder modulators that each includes an electrode and an arm waveguide, and the electrode is disposed on the arm waveguide, the program when executed by a computer causes the computer to:
prepare the plurality of Mach-Zehnder modulators;
measure a first transmittance which is a light transmittance in the arm waveguide while adjusting an operating point;
calculate a second transmittance which is a light transmittance in the arm waveguide;
calculate an optimized voltage using the first transmittance and the second transmittance;
calculate for each of the plurality of Mach-Zehnder modulators, based on the optimized voltage, a relationship between a voltage applied to the electrode and a phase change amount of light propagating through the arm waveguide;

acquire for each of the plurality of Mach-Zehnder modulators, based on the relationship, a second voltage in which a range of a phase change amount of light in each of the plurality of Mach-Zehnder modulators has a predetermined range; and store the second voltage in a storage unit.

10. A light transmission apparatus comprising:

a plurality of Mach-Zehnder modulators, each of the plurality of Mach-Zehnder modulators include an electrode and an arm waveguide, and each electrode is disposed on a respective arm waveguide;

a storage unit; and a processor communicatively coupled to the plurality of Mach-Zehnder modulators and the storage unit, wherein the processor is configured to:

measure, for each of the plurality of Mach-Zehnder modulators, a first transmittance which is a light transmittance in the arm waveguide while adjusting an operating point, calculate, for each of the plurality of Mach-Zehnder modulators, a second transmittance which is a light transmittance in the arm waveguide, calculate, for each of the plurality of Mach-Zehnder modulators, an optimized voltage using the first transmittance and the second transmittance, calculate, for each of the plurality of Mach-Zehnder modulators, based on the optimized voltage, a relationship between a voltage applied to the electrode and a phase change amount of light propagating through the arm waveguide, acquire, for each of the plurality of Mach-Zehnder modulators, based on the relationship, a second voltage in which a range of a phase change amount of light in each of the plurality Mach-Zehnder modulators has a predetermined range, and store, in the storage unit, for each of the plurality of Mach-Zehnder modulators, the second voltage.

* * * * *